(12) United States Patent
Kojima et al.

(10) Patent No.: US 10,133,407 B2
(45) Date of Patent: Nov. 20, 2018

(54) DISPLAY APPARATUS, DISPLAY SYSTEM, METHOD FOR CONTROLLING DISPLAY APPARATUS, AND PROGRAM

(71) Applicant: SEIKO EPSON CORPORATION, Tokyo (JP)

(72) Inventors: Teruhito Kojima, Shiojiri (JP); Masahide Takano, Matusmoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 72 days.

(21) Appl. No.: 15/372,079

(22) Filed: Dec. 7, 2016

(65) Prior Publication Data
US 2017/0185214 A1   Jun. 29, 2017

(30) Foreign Application Priority Data

Dec. 28, 2015 (JP) ................. 2015-256139
Dec. 28, 2015 (JP) ................. 2015-256140

(51) Int. Cl.
*G06F 3/041* (2006.01)
*G06T 19/00* (2011.01)
*G02B 27/01* (2006.01)
*G06F 3/0482* (2013.01)

(52) U.S. Cl.
CPC ......... *G06F 3/0416* (2013.01); *G02B 27/017* (2013.01); *G06T 19/006* (2013.01); *G06F 3/0482* (2013.01); *G06F 2203/04106* (2013.01); *G06F 2203/04108* (2013.01); *G06F 2203/04808* (2013.01)

(58) Field of Classification Search
CPC ............ G02B 27/017–27/0176; G06T 19/006
See application file for complete search history.

(56) References Cited

U.S. PATENT DOCUMENTS

| | | | |
|---|---|---|---|
| 2001/0050711 A1* | 12/2001 | Karube | G06F 1/16 348/220.1 |
| 2013/0021658 A1* | 1/2013 | Miao | G02B 27/283 359/256 |
| 2014/0078176 A1* | 3/2014 | Kim | G06F 3/017 345/633 |
| 2014/0225918 A1* | 8/2014 | Mittal | G06F 3/017 345/633 |
| 2014/0267403 A1* | 9/2014 | Maciocci | G06T 19/006 345/633 |

(Continued)

FOREIGN PATENT DOCUMENTS

JP   2015-118332 A   6/2015
WO  2015/092968 A1  6/2015

*Primary Examiner* — Charles Tseng
(74) *Attorney, Agent, or Firm* — Oliff PLC

(57) ABSTRACT

An HMD includes a right light guide and a left light guide as a display section that displays an image with the display section mounted on a user's head in such a way that the user is allowed to visually recognize a real object. The HMD further includes a right sensor section and a left sensor section that detect approach of an instruction body to the right light guide and the left light guide and touchpads that accept operation. A control section of the HMD relates contents displayed in the right light guide and the left light guide to operation corresponding to motion of the instruction body detected by the right sensor section and the left sensor section in response to the motion of the instruction body.

21 Claims, 15 Drawing Sheets

(56) References Cited

U.S. PATENT DOCUMENTS

2015/0358614 A1* 12/2015 Jin .................. G02B 27/017
          348/49
2016/0054802 A1* 2/2016 Dickerson ............ G06F 3/0487
          345/158
2016/0080672 A1* 3/2016 Braun ................ G02B 27/017
          348/333.01
2017/0060230 A1* 3/2017 Faaborg .................. G06F 3/011

* cited by examiner

DISPLAY APPARATUS, DISPLAY SYSTEM, METHOD FOR CONTROLLING DISPLAY APPARATUS, AND PROGRAM

BACKGROUND

1. Technical Field

The present invention relates to a display apparatus, a display system, a method for controlling the display apparatus, and a program.

2. Related Art

There is a known display apparatus of related art mounted on a head or a head mounted display (HMD) (see JP-A-2015-118332, for example). JP-A-2015-118332 describes an image display apparatus that is disposed in front of a user's eyes and allows the user to immerse a virtual-world image with no interference from the real world.

Some HMDs have a configuration that allows visual recognition the real space in the real world. As an application of an HMD of this type, an HMD used to assist work performed on a target in the real space is used, for example, in an application of displaying a text or an image. In this case, a user's action of touching a switch on a controller to allow the user to operate the HMD requires the user to make a hand for the touching operation available, which is cumbersome. Touching a touch sensor disposed in front a user's eyes also requires the user to make a hand for the touching operation available, as described in JP-A-2015-118332, which is cumbersome. Further, the touch sensor described in JP-A-2015-118332 is disposed in a space in front of the eyes and therefore cannot be used with an HMD configured to allow visual recognition of the real space in the real world.

SUMMARY

An advantage of some aspects of the invention is to allow a user on whom a head-mounted-type display apparatus is mounted to readily operate the display apparatus.

A display apparatus according to an aspect of the invention includes a display section that displays an image with the display section mounted on a user's head in such a way that the user is allowed to visually recognize a real object, a detection section that detects approach of an instruction body to a region close to the display section, an operation section that accepts operation, and a control section that relates a content displayed in the display section to operation corresponding to motion of the instruction body detected by the detection section in response to the motion of the instruction body.

According to the aspect of the invention, causing the instruction body to approach the display section allows the display apparatus to be readily operated without touching the display section, whereby the convenience of the display apparatus can be improved, for example, in a case where the user performs operation during work.

In the display apparatus according to the aspect of the invention, the control section may switch a normal action mode in which a process is executed in correspondence with operation accepted by the operation section to a proximity operation mode in which a process involving display operation performed by the display section is executed in accordance with a result of the detection performed by the detection section and vice versa, and the control section may activate the switched mode.

According to the aspect of the invention with this configuration, switching the proximity operation mode, in which operation involving proximity to the display section is performed, to the normal action mode and vice versa prevents wrong operation.

In the display apparatus according to the aspect of the invention, the control section may cause the display section to display a menu screen for operation, and the control section, in the normal action mode, may process operation accepted by the operation section as operation of selection or finalization of an item in the menu screen and, in the proximity operation mode, perform selection or finalization of an item in the menu screen in correspondence with approach or separation of an object detected by the detection section.

According to the aspect of the invention with this configuration, the display apparatus can be readily operated by using the menu screen in each of the normal action mode and the proximity operation mode.

In the display apparatus according to the aspect of the invention, the display section may include a display section for a left eye located on a side facing the user's left eye and a display section for a right eye located on a side facing the user's right eye in the state in which the display section is mounted on the user's head, and a process executed by the control section may be set in relation to a combination of operation performed on the display section for the left eye and detected by the detection section and operation performed on the display section for the right eye section and detected by the detection section.

According to the aspect of the invention with this configuration, since a process according to the combination of operation performed on the right side of the display apparatus and operation performed on the left side of the display apparatus is executed, possibility of wrong operation decreases, whereby an advanced, complicated process can be assigned to proximity operation. The display apparatus can therefore be more readily operated.

In the display apparatus according to the aspect of the invention, the control section may cause the display section to display a guide screen containing information on operation detected by the detection section. Information displayed in a left half of the guide screen may correspond to operation performed on a left portion of the display section for the left eye, and information displayed in a right half of the guide screen may correspond to operation performed on a right portion of the display section for the right eye.

According to the aspect of the invention with this configuration, the user can use the shape of the display section mounted on the user's head to intuitively perform operation while viewing the guide screen.

In the display apparatus according to the aspect of the invention, the control section may cause the display section to display a screen for operation in an aspect in which the screen for operation is visually recognized by both the user's right and left eyes, and the control section may change a displayed content in a left half of the screen for operation in correspondence with operation performed on a left portion of the display section for the left eye and change a displayed content in a right half of the screen for operation in correspondence with operation performed on a right portion of the display section for the right eye.

According to the aspect of the invention with this configuration, the user can use the shape of the display section mounted on the user's head to change the displayed contents in an aspect suitable for the user's feeling.

In the display apparatus according to the aspect of the invention, the detection section may detect approach of an object to the display section for the left eye and approach of an object to the display section for the right eye.

According to the aspect of the invention with this configuration, the user can readily operate the display apparatus without touching the display section.

In the display apparatus according to the aspect of the invention, the control section may change a content displayed by the display section in correspondence with operation of moving an object detected by the detection section in an upward/downward direction with respect to the user's head, operation of moving the object detected by the detection section in a rightward/leftward direction with respect to the user's head, and operation of causing the object detected by the detection section to approach or move away from the display section.

According to the aspect of the invention with this configuration, since operation of causing an object to approach or move away from the display section and operation of moving the object in the upward/downward direction or the rightward/leftward direction are detected, a variety of operations can be more readily performed on the display apparatus.

In the display apparatus according to the aspect of the invention, the control section may accept input of a position in an upward/downward direction or a rightward/leftward direction with respect to the user's head in a display region of the display section in a case where the detection section detects operation of moving an object along both the display section for the right eye and the display section for the left eye in the upward/downward direction or the rightward/leftward direction.

According to the aspect of the invention with this configuration, a position can be inputted by operation of moving an object in such a way that the object approaches the display section, whereby the display apparatus can be more readily operated.

In the display apparatus according to the aspect of the invention, in correspondence with operation performed in at least two positions and detected by the detection section, the control section may accept input corresponding to a position different from the detected operation positions.

According to the aspect of the invention with this configuration, in position input, restriction on correspondence between an inputted position and an operation position is eased, whereby the display apparatus can be more readily operated.

In the display apparatus described above, the detection section may detect contact to an outer surface of the display section and approach of an object to the outer surface of the display section from a position outside the display section.

In the display apparatus described above, the control section may rotate a content displayed in the display region of the display section in a case where the detection section detects rotation operation.

In the display apparatus described above, in a case where the detection section detects operation performed on two points and a distance between detected operation positions at the two points changes, the control section may enlarge or reduce the content displayed in the display region of the display section in correspondence with the change in the distance.

In the display apparatus according to the aspect of the invention, the detection section may detect approach of the instruction body to the display section or a holder that holds an optical part that forms the display section.

According to the aspect of the invention with these configurations, approach of the instruction body to a region close to the display section can be more reliably detected and reflected on a displayed content.

In the display apparatus according to the aspect of the invention, the detection section may include proximity sensors disposed around a circumference of the display section and relate the displayed content to operation control based on motion of the instruction body detected with the proximity sensors.

According to the aspect of the invention with this configuration, the proximity sensors disposed around the circumference of the display section allow approach of the instruction body to a region close to the display section to be more reliably detected and reflected on a displayed content.

In the display apparatus according to the aspect of the invention, in a case where the proximity sensors detect approach of the instruction body to a region close to the display section, the control section may cause the display section to display an operation control command image and relate operation performed on the operation section to the operation control command image.

According to the aspect of the invention with this configuration, operation can be performed by using motion of the instruction body detected with the proximity sensors disposed around the circumference of the display section and using the operation control command image, which functions, for example, as a GUI (graphical user interface), whereby operability can be improved.

In the display apparatus according to the aspect of the invention, in a case where the proximity sensors detect approach to two positions, the control section may cause the display section to display the operation control command image corresponding to the approach to the two positions, and with the operation control command image displayed, the control section may relate motion of the instruction bodies detected with the proximity sensors in a predetermined direction to motion of the operation control command image displayed by the display section in the predetermined direction.

According to the aspect of the invention with this configuration, operation of causing instruction bodies to approach the proximity sensors in two positions allows the operation control command image displayed by the display section to move in the direction corresponding to the motion of the instruction bodies. The two instruction bodies therefore readily allow position instruction, direction instruction, and other instructions.

In the display apparatus according to the aspect of the invention, the control section may cause the display section to display a displayed content that shows an arrangement of the proximity sensors with respect to the display section.

According to the aspect of the invention with this configuration, operation of causing the instruction body to approach to the proximity sensors can be more reliably performed.

In the display apparatus according to the aspect of the invention, the display section may be configured to transmit outside light so that the real object is allowed to be visually recognized and display an image in such a way that the image is superimposed on the real object for visual recognition.

According to the aspect of the invention with this configuration, the user on whom the display section, which transmits outside light for visual recognition of a real object and allows the user to visually recognize an image, is mounted visually recognizes the real object superimposed on the image. The user can then perform operation of causing an instruction body to approach the display section on the basis of the visually recognized image. As a result, a displayed content associated with the real object can be readily controlled by simple operation of causing the instruction body to approach the display section.

A display apparatus according to another aspect of the invention includes a display section that displays an image with the display section mounted on a user's head in such a way that the user is allowed to visually recognize a real space, a detection section that detects approach of an instruction body to a region close to the display section, and a control section that executes a process involving display operation performed by the display section in correspondence with a result of detection performed by the detection section. A process executed by the control section is set in relation to at least two types of operation performed in the region close to the display section and detected by the detection section, and the control section executes the set process in a case where the detection section detects the at least two types of operation performed in the region close to the display section.

According to the aspect of the invention, causing the instruction body to approach the display section allows the display apparatus to be readily operated without touching the display section, whereby the convenience of the display apparatus can be improved, for example, in a case where the user performs operation during work. Further, since a process related to at least two types of operation performed on the region close to the display section is executed, wrong operation can be avoided.

In the display apparatus according to the aspect of the invention, the display section may include a display section for a left eye located on a side facing the user's left eye and a display section for a right eye located on a side facing the user's right eye in the state in which the display section is mounted on the user's head, and a process executed by the control section may be set in relation to a combination of operation performed on the display section for the left eye and detected by the detection section and operation performed on the display section for the right eye section and detected by the detection section.

According to the aspect of the invention with this configuration, wrong operation can be more reliably avoided.

In the display apparatus according to the aspect of the invention, the detection section may detect operation of causing an object to approach and come into contact with the display section for the left eye and operation of causing an object to approach and come into contact with the display section for the right eye.

According to the aspect of the invention with this configuration, the user can operate the display apparatus in a variety of aspects, and wrong operation can be avoided.

In the display apparatus according to the aspect of the invention, in a case where the detection section detects approach to two positions, the control section may cause the display section to display an operation control command image corresponding to the approach to the two positions, and with the operation control command image displayed, the control section may relate motion of the instruction bodies detected by the detection section in a predetermined direction to motion of the operation control command image displayed by the display section in the predetermined direction.

According to the aspect of the invention with this configuration, in accordance with operation of causing instruction bodies to approach the detection section in two positions, the operation control command image displayed by the display section can be move in the direction corresponding to the motion of the instruction bodies. The two instruction bodies therefore readily allow position instruction, direction instruction, and other instructions.

In the display apparatus according to the aspect of the invention, the control section may accept input of a position in an upward/downward direction or a rightward/leftward direction with respect to the user's head in a display region of the display section in a case where the detection section detects operation of moving an object along both the display section for the right eye and the display section for the left eye in the upward/downward direction or the rightward/leftward direction.

According to the aspect of the invention with this configuration, a position can be inputted without touching the display section.

In the display apparatus described above, the detection section may detect contact to an outer surface of the display section and approach of an object to the outer surface of the display section from a position outside the display section.

In the display apparatus described above, the control section may rotate a content displayed in a display region of the display section in a case where the detection section detects operation of rotating an object.

In the display apparatus described above, in a case where the detection section detects operation performed on two points and a distance between detected operation positions at the two points changes, the control section may enlarge or reduce a content displayed in the display region of the display section in correspondence with the change in the distance.

The display apparatus according to the aspect of the invention may further include an imaging section, and in a case where the detection section detects operation of causing an object to be in contact with a surface of the display section for at least a predetermined period or operation of causing an object to cover at least a predetermined area of the display section, the control section may cause the imaging section to perform imaging.

According to the aspect of the invention with these configurations, the imaging can be readily performed by operation performed on the display section, whereby wrong operation can be avoided.

The display apparatus according to the aspect of the invention may further include an operation section that accepts operation. The control section may switch a normal action mode in which a process is executed in correspondence with operation accepted by the operation section to a proximity operation mode in which a process involving display operation performed by the display section is executed in accordance with a result of the detection performed by the detection section and vice versa, and the control section may activate the switched mode.

According to the aspect of the invention with this configuration, switching the proximity operation mode, in which proximity operation is performed, to the normal action mode and vice versa prevents wrong operation.

In the display apparatus according to the aspect of the invention, the detection section may detect approach of the instruction body to the display section or a holder that holds an optical part that forms the display section.

According to the aspect of the invention with this configuration, approach of the instruction body to a region close to the display section can be more reliably detected and reflected on a displayed content.

In the display apparatus according to the aspect of the invention, the detection section may include proximity sensors disposed around a circumference of the display section and relate the displayed content to operation control based on motion of the instruction body detected with the proximity sensors.

According to the aspect of the invention with this configuration, the proximity sensors disposed in a region close to the display section allow approach of the instruction body to a region close to the display section to be more reliably detected and reflected on a displayed content.

In the display apparatus according to the aspect of the invention, in a case where the proximity sensors detect approach of the instruction body to a region close to the display section, the control section may cause the display section to display an operation control command image and relate operation performed on the operation section to the operation control command image.

According to the aspect of the invention with this configuration, operation can be performed by using motion of the instruction body detected with the proximity sensors disposed around the circumference of the display section and using the operation control command image, which functions, for example, as a GUI (graphical user interface), whereby operability can be improved.

In the display apparatus according to the aspect of the invention, the display section may be configured to transmit outside light so that the real space is allowed to be visually recognized and display an image in such a way that the image is superimposed on the real space for visual recognition.

According to the aspect of the invention with this configuration, the user on whom the display section, which transmits outside light for visual recognition of a real space and allows the user to visually recognize an image, is mounted visually recognizes the real space superimposed on the image. The user can then perform operation of causing an instruction body to approach the display section on the basis of the visually recognized image. As a result, a displayed content associated with the real space can be readily controlled by simple operation of causing the instruction body to approach the display section.

Another aspect of the invention is directed to a method for controlling a display apparatus including a display section that displays an image with the display section mounted on a user's head in such a way that the user is allowed to visually recognize a real object and an operation section that accepts operation, the method including detecting approach of an instruction body to a region close to the display section and relating a content displayed in the display section to operation corresponding to detected motion of the instruction body in response to the motion of the instruction body.

Executing the control method according to the aspect of the invention in such a way that the instruction body is caused to approach the display section allows the display apparatus to be readily operated without touching the display section, whereby the convenience of the display apparatus can be improved, for example, in a case where the user performs operation during work.

Another aspect of the invention is directed to a method for controlling a display apparatus including a display section that displays an image with the display section mounted on a user's head in such a way that the user is allowed to visually recognize a real space and an operation section that accepts operation, the method including setting a process executed in relation to at least two types of operation performed in a region close to the display section, detecting approach of an instruction body to the region close to the display section, and executing the set process in a case where the at least two types of operation performed in the region close to the display section are detected.

Executing the control method according to the aspect of the invention allows the display apparatus to be readily operated without touching the display section, whereby the convenience of the display apparatus can be improved, for example, in a case where the user performs operation during work. Further, since a process related to at least two types of operation performed on the display section is executed, wrong operation can be avoided.

Another aspect of the invention is directed to a program executable by a computer that controls a display apparatus including a display section that displays an image with the display section mounted on a user's head in such a way that the user is allowed to visually recognize a real object and an operation section that accepts operation, the program causing the computer to detect approach of an instruction body to a region close to the display section and relate a content displayed in the display section to operation corresponding to detected motion of the instruction body in response to the motion of the instruction body.

Causing the computer to execute the program according to the aspect of the invention allows the display apparatus to be readily operated without touching the display section, whereby the convenience of the display apparatus can be improved, for example, in a case where the user performs operation during work.

Another aspect of the invention is directed to a program executable by a computer that controls a display apparatus including a display section that displays an image with the display section mounted on a user's head in such a way that the user is allowed to visually recognize a real space and an operation section that accepts operation, the program causing the computer to detect approach of an instruction body to a region close to the display section in a case where a process executed in relation to at least two types of operation performed in the region close to the display section is set and execute the set process in a case where the at least two types of operation performed in the region close to the display section are detected.

Causing the computer to execute the program according to the aspect of the invention allows the display apparatus to be readily operated without touching the display section, whereby the convenience of the display apparatus can be improved, for example, in a case where the user performs operation during work. Further, since a process related to at least two types of operation performed on the display section is executed, wrong operation can be avoided.

The programs according to the aspects of the invention can also each be provided in the form of a recording medium on which the program is recorded in a computer readable manner or in any other aspect. Examples of the recording medium may include a flexible disk, an HDD (hard disk drive), a CD-ROM (compact disk read only memory), a DVD (digital versatile disk), a Blu-ray (registered trademark) disc, a magneto-optical disk, a nonvolatile memory card, an internal storage device in an image display apparatus (RAM (random access memory), ROM (read only memory), or any other semiconductor memory), an external storage device (such as USB (universal serial bus) memory), and a variety of other media that can be read by the computer.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
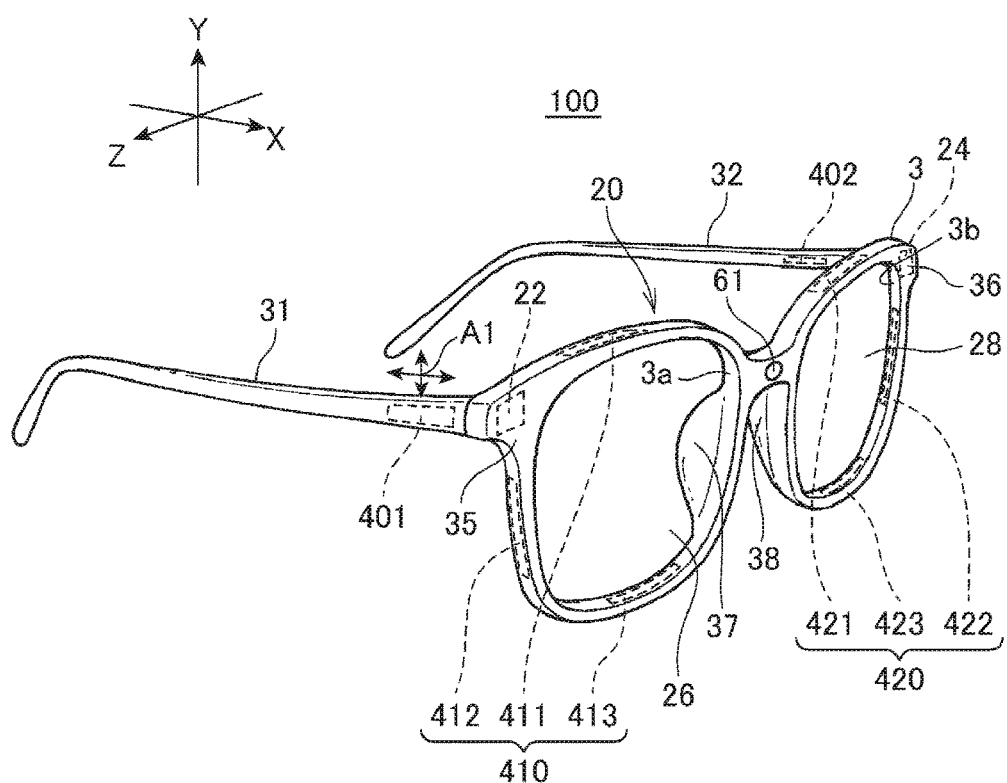
FIG. 1 shows an exterior appearance of an HMD according to a first embodiment.
Figure 2:
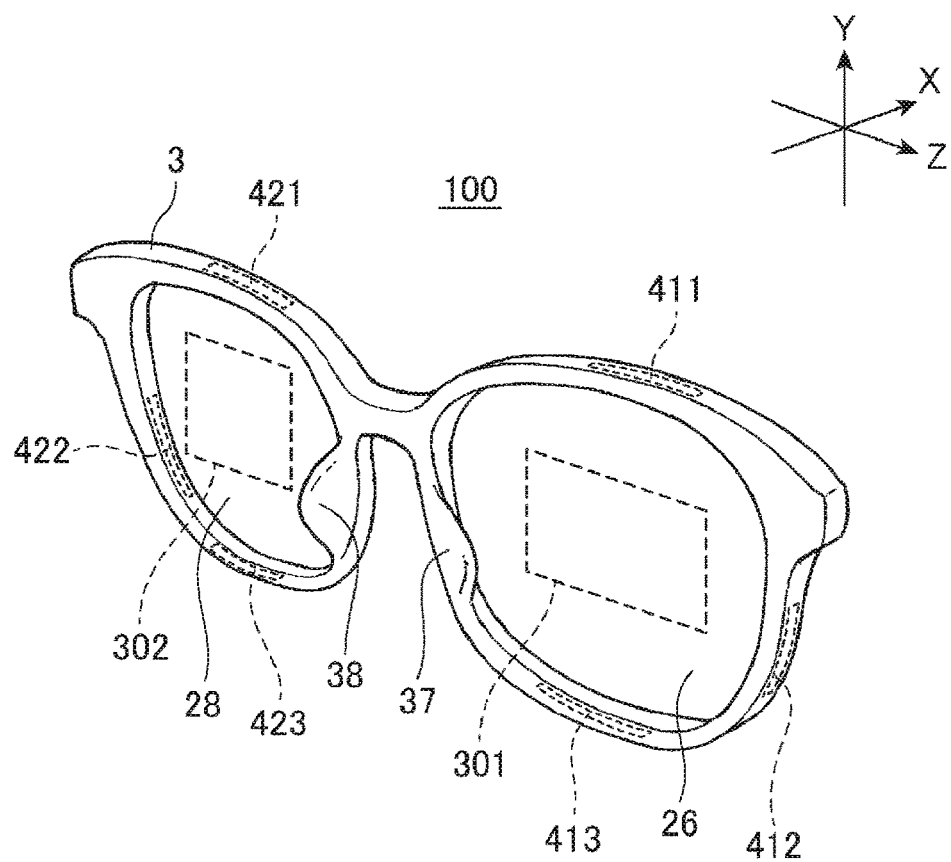
FIG. 2 shows an exterior appearance of the HMD according to the first embodiment.

FIGS. 1 and 2 are descriptive diagrams showing exterior configurations of an HMD 100 according to an embodiment to which the invention is applied.

An HMD 100 is a glasses-shaped display apparatus that is mounted on a user's head and allows the user to visually recognize a virtual image. FIG. 1 is a perspective view of the display apparatus viewed from the front side thereof, and FIG. 2 is a perspective view of the display apparatus viewed from the rear side thereof. In FIG. 2, no right holder 31 or left holder 32 is shown for ease of illustration.

A frame 3, which forms a main body of the HMD 100, includes a right light guide 26 and a left light guide 28, each of which is located in front of the user's face and displays an image, and has a glasses-like frame-shaped member that holds the right light guide 26 and the left light guide 28. The frame 3 further includes a right holder 31 and a left holder 32, which come into contact with the user's temporal regions. The HMD 100 as a whole has the same shape as the shape of the frame of glasses for vision correction, sunglasses, and other glasses, and the frame 3 can be so shaped as to be similar, for example, to a glasses frame.

The right holder 31 and the left holder 32, which serve in the same manner as temples (bows) of glasses do, hold the frame 3 on the user's head. The right light guide 26, which is located in front of the right eye of the user on whom the HMD 100 is mounted and allows the user's right eye to visually recognize an image, is attached to the frame 3. The left light guide 28, which is located in front of the left eye of the user on whom the HMD 100 is mounted and allows the user's left eye to visually recognize an image, is also attached to the frame 3. The right light guide 26 and the left light guide 28 are each an optical element (optical part) that transmits light and are fit into and held by rims 3a and 3b, which are formed as part of the frame 3, as the lenses of glasses are fit and held.

Nose pads 37 and 38, which support the frame 3 with the aid of the nose of the user on whom the HMD 100 is mounted, are provided in a center position of the frame 3. The center position where the nose pads 37 and 38 are provided is located in front of the middle of the user's forehead, and a camera 61 is provided in the position.

Frame end sections 35 and 36, which are located at the right and left ends of the frame 3, incorporate a variety of optical systems that will be described later.

The camera 61 is a digital camera including an imaging device, such as a CCD and a CMOS device, an imaging lens, and other components and may be formed of a stereoscopic camera. The camera 61 captures an image of at least part of an outside scene (real space) present in the direction extending from the front side of the HMD 100, in other words, in the direction toward the visual field of the user on whom the HMD 100 is mounted. In another expression, it can be said that the camera 61 performs imaging over the range or in the direction that overlaps with the user's visual field and performs imaging in the direction at which the user gazes. The size of the angle of view of the camera 61 can be set as appropriate. In the present embodiment, the angle of view of the camera 61 covers the outside visually recognized by the user through the right light guide 26 and the left light guide 28, as will be described later. Further, it is more preferable that the imaging range of the camera 61 is so set that the camera 61 can capture an image of the user's entire visual field through the right light guide 26 and the left light guide 28 can be captured.

The camera 61 performs the imaging under the control of an imaging control section 161 (FIG. 5), which is provided in a control section 140, and outputs captured image data to the imaging control section 161.

A right display driver 22 and a left display driver 24 each form image light. The image light formed by the right display driver 22 is guided through the right light guide 26 to the user's right eye, and the image light formed by the left display driver 24 is guided through the left light guide 28 to the user's left eye. For example, FIG. 1 shows an example of a configuration in which the right display driver 22 is accommodated in the frame end section 35 and the left display driver 24 is accommodated in the frame end section 36.

Figure 3:
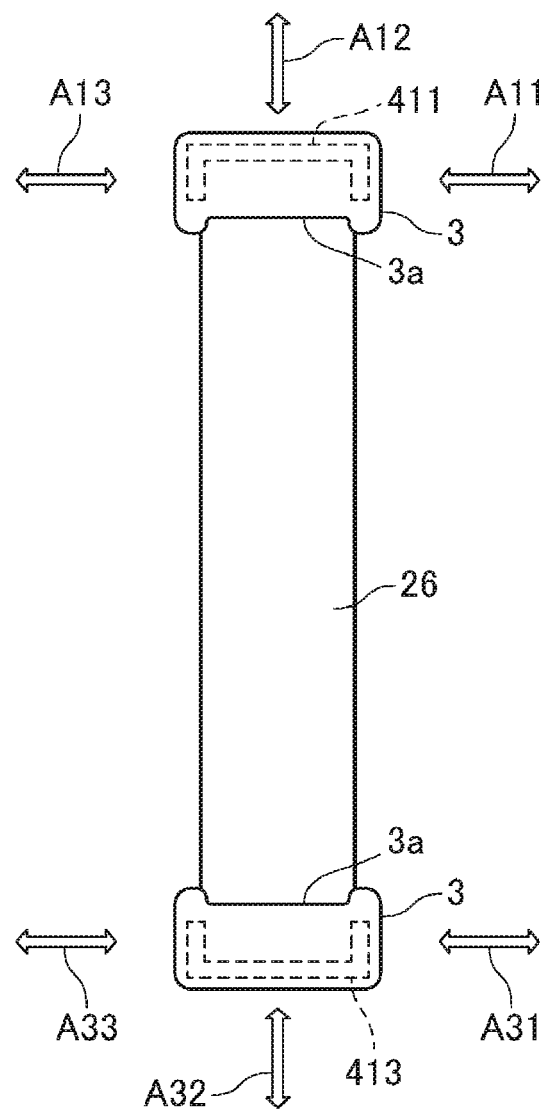
FIG. 3 is a key part cross-sectional view showing the configuration of the HMD.

FIG. 3 is a key part cross-sectional view showing the configuration of the HMD 100 and shows a longitudinal cross-section of the HMD 100 taken at the position containing the right light guide 26 and the frame 3, which supports the circumference thereof.

The right light guide 26 is supported by the frame 3 with the circumference of the right light guide 26 surrounded by the rim 3a. The rim 3a has a grooved shape, and the right light guide 26 is fit into the rim 3a.

Figure 4:
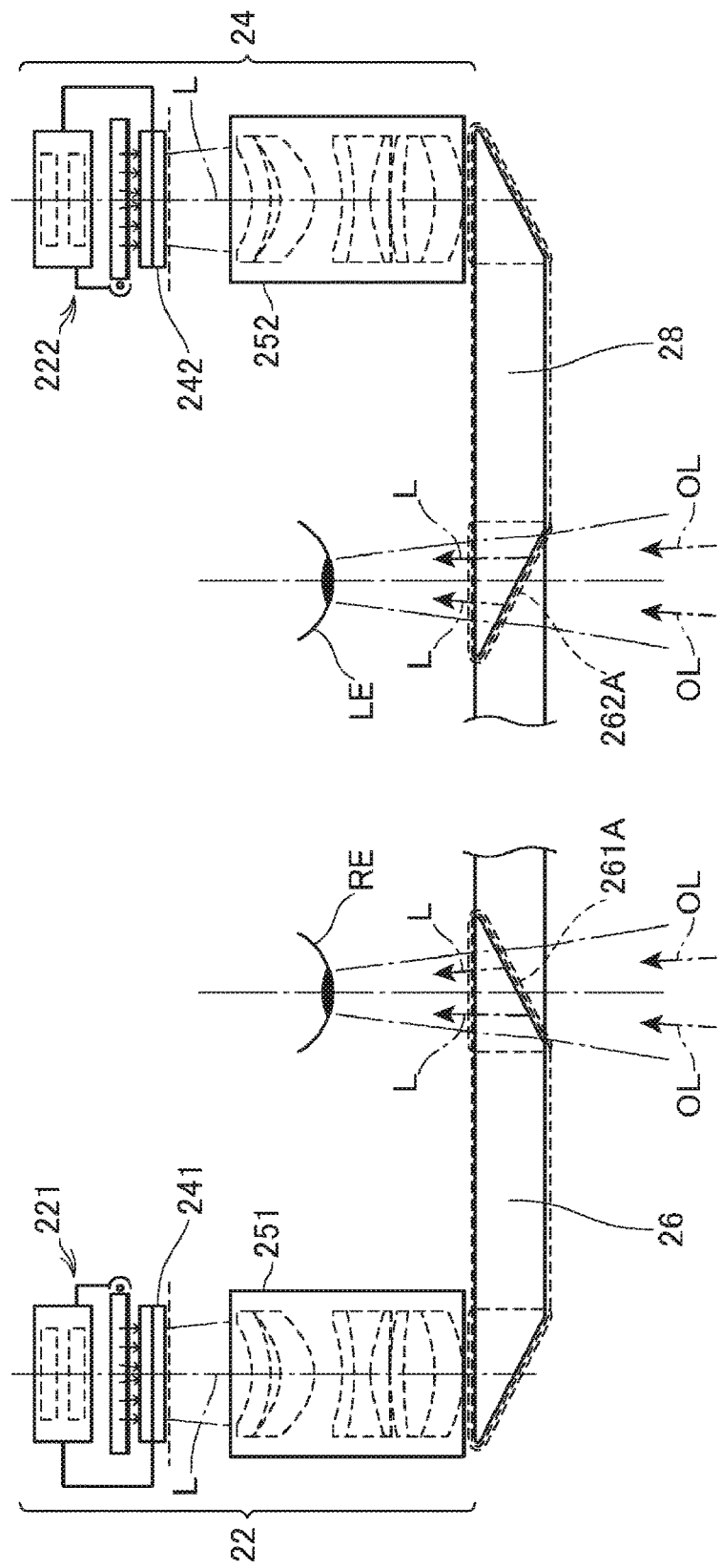
FIG. 4 shows the configuration of the optical system of an image display section.

FIG. 4 is a key part plan view showing the configuration of the optical system of the HMD 100. FIG. 4 shows the user's right eye RE and left eye LE for ease of description.

The display drivers 22 and 24 include liquid crystal displays 241 and 242 (hereinafter referred to as "LCDs 241 and 242"), projection systems 251 and 252, and other components.

The right display driver 22 and the left display driver 24 are configured in a bilateral symmetric manner. The right display driver 22 includes a right backlight 221, which includes a light source, such as an LED, and a diffuser, the right LCD 241, which is a transmissive LCD disposed on the optical path of light emitted from the diffuser in the right backlight 221, and the right optical system 251, which includes a lens group and other components that guide image light L having passed through the right LCD 241. The right LCD 241 is a transmissive liquid crystal panel having a plurality of pixels arranged in a matrix.

The left display driver 24 includes a left backlight 222, which includes a light source, such as an LED, and a diffuser, the left LCD 242, which is a transmissive LCD disposed on the optical path of light emitted from the diffuser in the left backlight 222, and the left optical system 252, which includes a lens group and other components that guide image light L having passed through the left LCD 242. The left LCD 242 is a transmissive liquid crystal panel having a plurality of pixels arranged in a matrix.

The image light emitted by the right display driver 22 and the image light emitted by the left display driver 24 enter the right light guide 26 and the left light guide 28, respectively.

The right light guide 26 and the left light guide 28 are each made, for example, of a light transmissive resin and guide the image light outputted by the display drivers 22 and 24 to the user's eyes.

The left optical system 252 has a collimator lens that converts the image light L having exited out of the left LCD 242 into a parallel light flux. The image light L converted by the collimator lens into a parallelized light flux enters the left light guide 28. The left light guide 28 is a prism having a plurality of reflection surfaces that reflect the image light L, and the image light L is reflected multiple times in the left light guide 28 and guided toward the left eye LE. A half-silvered mirror 262A (reflection surface), which is located in front of the left eye LE, is formed on the left light guide 28.

The image light L reflected off the half-silvered mirror 262A exits out of the left light guide 28 toward the left eye LE and forms an image on the retina of the left eye LE, and the image is visually recognized by the user.

The right optical system 251 has a collimator lens that converts the image light L having exited out of the right LCD 241 into a parallel light flux. The image light L converted by the collimator lens into a parallelized light flux enters the right light guide 26. The right light guide 26 is a prism having a plurality of reflection surfaces that reflect the image light L, and the image light L is reflected multiple times in the right light guide 26 and guided toward the right eye RE. A half-silvered mirror 261A (reflection surface), which is located in front of the right eye RE, is formed on the right light guide 26.

The image light L reflected off the half-silvered mirror 261A exits out of the right light guide 26 toward the right eye RE and forms an image on the retina of the right eye RE, and the image is visually recognized by the user.

The image light L reflected off the half-silvered mirror 261A and outside light OL having passed through the right light guide 26 are incident on the user's right eye RE. The image light L reflected off the half-silvered mirror 262A and the outside light OL having passed through the left light guide 28 are incident on the user's left eye LE. The HMD 100 thus superimposes the image light L carrying an image processed in the HMD 100 on the outside light OL and causes the superimposed light to be incident on the user's eyes, and the user views an outside scene through the right light guide 26 and the left light guide 28 and visually recognizes an image formed by the image light L and superimposed on the outside scene. The HMD 100 thus functions as a see-through display apparatus.

In the present embodiment, the right light guide 26 and the left light guide 28 are configured not to form a real image but configured to form a virtual image and allow the user to visually recognize the image. In the present embodiment, however, an expression "display an image" is used in the sense that the right light guide 26 and the left light guide 28 allow the user to consequently recognize an image. In other words, the HMD 100 only needs to so output the image light L, which forms an image, toward the user as to allow the user to recognize the image irrespective of whether the image is a real image or a virtual image.

The left projection system 252 and the left light guide 28 can also be collectively called a "left display unit," and the right projection system 251 and the right light guide 26 can also be collectively called a "right display unit." Each of the right and left display units is not necessarily configured as described in the above example and can be arbitrarily configured as long as the image light is used to form a virtual image in front of the user's eyes. For example, a diffraction grating may be used, or a semi-transmissive/reflective film may be used.

The right light guide 26 and the left light guide 28 allow the user's right and left eyes to visually recognize rectangular images, respectively, as shown in FIG. 2. A rectangular right display section 301, which corresponds to the right eye, is a rectangular image display region formed by the half-silvered mirror 261A and is formed of the image light formed by the right projection system 251. A left display section 302 is a rectangular image display region formed by the half-silvered mirror 262A and is formed of the image light formed by the left projection system 252.

Therefore, during a period for which the HMD 100 displays an image, the half-silvered mirror 261A is visible to the user as a quadrangular region located in the right display section 301, and the half-silvered mirror 262A is visible to the user as a quadrangular region located in the left display section 302. Since the entire half-silvered mirrors 261A and 262A transmit outside light, as described above, the user visually recognizes the entire right display section 301 and left display section 302 superimposed on an outside scene.

The camera 61 is disposed in the center position of the front surface of the frame 3, as shown in FIG. 1, and performs imaging in the direction in which the user's two eyes face, that is, in the direction extending from the front side of the user. In other words, the imaging direction, that is, the angle of view of the camera 61 faces a region in front of the user and faces the direction of the line of sight of the user who looks at the real space (outside scene). The camera 61 may include what is called a wide-angle lens as the imaging lens so as to be capable of performing imaging over a wide angle of view. The wide-angle lens may include a lens called a super-wide-angle lens or a semi-wide-angle lens or may be a fixed-focal-length lens or a zoom lens, or the camera 61 may include a lens group formed of a plurality of lenses.

In the following description, directions with respect to the frame 3 will be described by using orthogonal coordinates X, Y, and Z, as shown in FIG. 1. The X direction is the direction in which an object approaches and moves away from the front surface of the frame 3 including the right light guide 26 and the left light guide 28, and the X direction corresponds to the direction of extensions of the right holder 31 and the left holder 32. It can also be said that the X direction is a depth direction in the user's visual field. The Y direction is the height direction of the HMD 100. More specifically, the Y direction is the height direction of the frame 3 and the vertical direction in the visual field of the user on whom the HMD 100 is mounted. The Z direction is the width direction of the frame 3. More specifically, the Z direction corresponds to the direction in which the right light guide 26 and the left light guide 28 are arranged side by side and the direction along a roughly horizontal line that connects the right and left eyes of the user on whom the HMD 100 is mounted to each other.

The HMD 100 includes an external sensor 400, which detects externally inputted operation, and touchpads 401 and 402.

The external sensor 400 is formed of a right sensor section 410 and a left sensor section 420.

The touchpads 401 and 402 are so disposed as to face the side surfaces of the HMD 100 mounted on the user. In more detail, the touchpad 401 is disposed on the right holder 31 on the surface thereof facing the outside with respect to the frame 3, and the touchpad 402 is disposed on the left holder 32 on the surface thereof facing the outside with respect to the frame 3. The touchpads 401 and 402 may have an elongated shape in accordance with the shape of the right holder 31 and the left holder 32 or may have a rectangular shape. The user on whom the HMD 100 is mounted can operate the tough pad 401, for example, with the right hand and the tough pad 402, for example, with the left hand.

Each of the touchpads 401 and 402 is an operation section (operation accepting section) that detects contact operation and identifies the operation position and is, for example, a capacitance-type or pressure-sensitive-type touch panel.

The right sensor section 410 and the left sensor section 420 are disposed on the front side of the frame 3.

The right sensor section 410 is formed of sensors 411, 412, and 413. The sensors 411, 412, and 413 are disposed along the circumference of the right light guide 26. In detail, the sensor 411 is located above the right light guide 26, is so disposed as to extend in the Z direction, and has a horizontally elongated detection region. The sensor 412 is so disposed in a position facing a side of the right light guide 26 as to extend in the Y direction and has a vertically elongated detection region. The sensor 413 is so disposed below the right light guide 26 as to extend in the Z direction and has a horizontally elongated detection region.

Each of the sensors in the right sensor section 410 is preferably so disposed as not to overlap with the right light guide 26 so that the sensor does not block the outside light OL passing through the right light guide 26. In a case where the sensors 411, 412, and 413 can transmit the outside light OL, the sensors 411, 412, and 413 may overlap with the right light guide 26.

The left sensor section 420 is formed of sensors 421, 422, and 423. The sensors 421, 422, and 423 are disposed along the circumference of the left light guide 28. In detail, the sensor 421 is located above the left light guide 28, is so disposed as to extend in the Z direction, and has a horizontally elongated detection region. The sensor 422 is so disposed in a position facing a side of the left light guide 28 as to extend in the Y direction and has a vertically elongated detection region. The sensor 423 is so disposed below the left light guide 28 as to extend in the Z direction and has a horizontally elongated detection region. Each of the sensors that form the left sensor section 420 is preferably so disposed as not to overlap with the left light guide 28 so that the sensor does not block the outside light OL passing through the left light guide 28. In a case where the sensors 421, 422, and 423 can transmit the outside light OL, the sensors 421, 422, and 423 may overlap with the left light guide 28.

The right sensor section 410 forms a detection section corresponding to a region close to the right light guide 26, and the left sensor section 420 forms a detection section corresponding to a region close to the left light guide 28.

Each of the sensors 411, 412, 413, 421, 422, and 423 is a proximity sensor that detects approach of an object and is formed, for example, of a capacitance-type sensor. The detection range of each of the sensors 411, 412, 413, 421, 422, and 423 extends over a region in front of the HMD 100. That is, the right sensor section 410 and the left sensor section 420 detect an object that moves toward the front side of the HMD 100 when the object moves from a position outside the detection range to a position in the detection range. An object that is present in the real space and is detected by the right sensor section 410 and the left sensor section 420 is called an operation body (instruction body).

It is preferable that the proximity sensor can detect, for example, an operation body that does not come into contact with the proximity sensor but is present within 1 cm of the proximity sensor. Instead, an operation body that comes into contact with any of the proximity sensors may be detected. It is further preferable that wrong sensing in a state in which the HMD 100 is mounted on the user can be avoided or suppressed. For example, a wrong sensing suppression function in the state in which the HMD 100 is mounted on the user may include sensitivity adjustment, sensitivity customization, and other capabilities. A proximity sensor to be used may have a directivity-set detection direction that prevents approach of an operation body from being detected in the space between the right light guide 26/the left light guide 28 and the user's face in the state in which the HMD 100 that is mounted on the user.

The sensor 411, which is located above the right light guide 26, can detect an operation body that moves toward the front side of the frame 3, as indicated by the arrow A11 in FIG. 3. The sensor 411 may instead be capable of detecting an operation body that moves toward the rear side of the frame 3, as indicated by the arrow A13. The sensor 411 can further detect an operation body that moves toward the upper side of the frame 3, as indicated by the arrow A12. That is, the sensor 411 can detect an object (operation body) that approaches the frame 3 along the X and Y directions. The same holds true for the sensor 421.

The sensor 413, which is located below the right light guide 26, can detect an operation body that moves toward the front side of the frame 3, as indicated by the arrow A31. The sensor 413 may instead be capable of detecting an operation body that moves toward the rear side of the frame 3, as indicated by the arrow A33. The sensor 413 can further detect an operation body that moves toward the lower side of the frame 3, as indicated by the arrow A32. That is, the sensor 413 can detect an object that approaches the frame 3 along the X and Y directions. The same holds true for the sensor 423.

The sensors 412 and 422 can detect an object that approaches the HMD 100 along the X and Z directions. Each of the sensors 412 and 422 further detects movement of an operation body when it moves in the X or Y direction within the detectable range of the sensor.

Each of the sensors 411 and 421 further detects movement of an operation body when it moves in the X or Z direction within the detectable ranges of the sensors 411 and 421. Each of the sensors 413 and 423 further detects movement of an operation body when it moves in the X or Z direction within the detectable range of the sensor.

The HMD 100 can detect that approach of an object on the basis of a detection value from each of the sensors in the right sensor section 410 and a detection value from each of the sensors in the left sensor section 420. Further, analysis of a detection value from each of the sensors allows detection of movement of the object present within the detection range.

Figure 5:
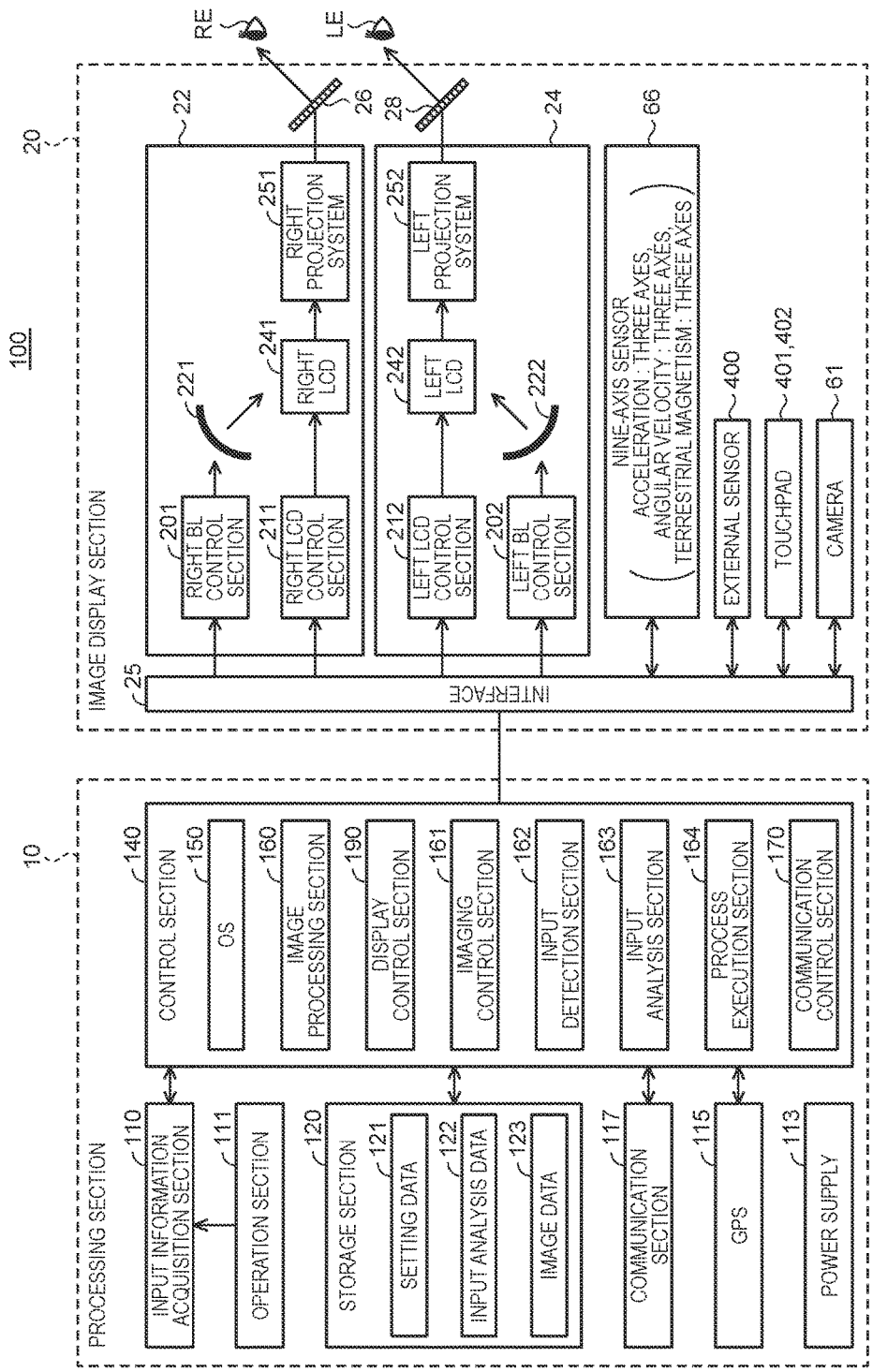
FIG. 5 is a block diagram of functions of portions that form the HMD.

FIG. 5 is a block diagram showing the functions of the portions that form the HMD 100.

The HMD 100 includes a processing section 10 and an image display section 20 in a broad classification.

The image display section 20 includes the right display driver 22 and the left display driver 24, which supply the right light guide 26 and the left light guide 28 with image light. The image display section 20 further includes a configuration section disposed in the frame 3, specifically, includes the camera 61, a nine-axis sensor 66, the external sensor 400, and the touchpads 401 and 402. For example, FIG. 1 shows an exemplary configuration in which the right display driver 22 is accommodated in the frame end section 35 and the left display driver 24 is accommodated in the frame end section 36. The other portions that form the image display section 20 may be disposed in the frame end sections 35 and 36 of the frame 3 or a front-surface-containing portion of the frame 3.

The right display driver 22, the left display driver 24, the camera 61, the nine-axis sensor 66, the external sensor 400, and the touchpads 401 and 402, which are provided in the image display section 20, are connected to an interface 25.

The interface 25 is connected to the control section 140, which is provided in the processing section 10. The control section 140 functions as an image processing section 160, an imaging control section 161, an input detection section 162, an input analysis section 163, a process execution section 164, a communication control section 170, and a display control section 190, as will be described later. The interface 25 connects the sections of the control section 140 to the sections in the processing section 10 and allows transmission and reception of a variety of data and signals.

For example, the interface 25 outputs control signals outputted by the display control section 190 to the right display driver 22 and the left display driver 24. The interface 25 further outputs a control signal transmitted from the display control section 190 to a corresponding right backlight control section 201 or left backlight control section 202.

The interface 25 further connects the camera 61, the nine-axis sensor 66, the external sensor 400, and the touchpads 401 and 402 to the control section 140.

The right display driver 22 includes the right backlight 221, the right LCD 241, and the right projection system 251 described above. The right display driver 22 further includes the right backlight (BL) control section 201, which controls the right backlight (BL) 221, and a right LCD control section 211, which drives the right LCD 241.

The right backlight control section 201 drives the right backlight 221 in accordance with the control signal transmitted by the display control section 190. The right LCD control section 211 drives the right LCD 241 on the basis of a signal transmitted by the image processing section 160 and a signal transmitted by the display control section 190.

The left display driver 24 has the same configuration as that of the right display driver 22. The left display driver 24 includes the left backlight 222, the left LCD 242, and the left projection system 252 described above. The left display driver 24 further includes the left backlight control section 202, which drives the left backlight 222, and a left LCD control section 212, which drives the left LCD 242.

The left backlight control section 202 drives the left backlight 222 in accordance with the control signal transmitted by the display control section 190. The left LCD control section 212 drives the left LCD 242 on the basis of a signal transmitted by the image processing section 160 and a signal transmitted by the display control section 190.

The right backlight control section 201, the right LCD control section 211, the right backlight 221, and the right LCD 241 are collectively also called a right "image light generation unit." Similarly, the left backlight control section 202, the left LCD control section 212, the left backlight 222, and the left LCD 242 are collectively also called a left "image light generation unit."

The camera 61 performs imaging in accordance with control data inputted from the imaging control section 161 and outputs captured imaged data to the imaging control section 161 via the interface 25.

The nine-axis sensor 66 is a motion sensor (inertia sensor) that detects acceleration (three axes), angular velocity (three axes), and terrestrial magnetism (three axes). The nine-axis sensor 66 may be a sensor unit formed of a plurality of sensors integrated with one another. The nine-axis sensor 66 is connected to the control section 140 via the interface 25, performs detection in a predetermined cycle (at predetermined sampling frequency) under the control of the control section 140, and outputs detection values to the control section 140. In the state in which the HMD 100 is mounted on the user's head, the control section 140 can detect motion of the user's head on the basis of the detection values from the nine-axis sensor 66.

The external sensor 400 shown in FIG. 5 includes the right sensor section 410 and the left sensor section 420, and each of the right sensor section 410 and the left sensor section 420 may be connected to the interface 25. For example, the sensors 411, 412, and 413 in the right sensor section 410 may be combined with one another into a unit, and the unit may be connected to the interface 25. Similarly, the sensors 421, 422, and 423 in the left sensor section 420 may be combined with one another into a unit, and the unit may be connected to the interface 25. Instead, each of the sensors 411, 412, 413, 421, 422, and 423 may be connected to the interface 25.

The external sensor 400 performs detection in a predetermined cycle (at predetermined sampling frequency) under the control of the input detection section 162 and outputs detection values to the input detection section 162.

Each of the touchpads 401 and 402 is connected to the interface 25. Each of the touchpads 401 and 402 performs detection in a predetermined cycle (at predetermined sampling frequency) under the control of the input detection section 162 and outputs a detection value to the input detection section 162.

Each of the touchpads 401 and 402 may include a detection circuit (not shown) that analyzes a detection value from the touchpad, and the detection circuit may be connected to the interface 25. In this case, each of the touchpads 401 and 402 performs the detection under the control of the detection circuit, and the detection circuit detects contact operation performed on the touchpads 401 and/or 402, identifies the operation positions, and outputs data representing the operation positions to the input detection section 162. Instead, the input detection section 162 may detect contact operation and identify the operation positions on the basis of detection values inputted from the touchpads 401 and/or 402.

The processing section 10 controls the HMD 100. The processing section 10 includes an operation section 111, which accepts the user's operation. The operation section 111, for example, includes a power switch (not shown) that instructs power-on/off of the HMD 100 and a variety of other switches.

The portions that form the processing section 10 are accommodated, for example, in the frame end sections 35 and 36 of the frame 3. Instead, the entirety or part of the processing section 10 may be accommodated in the right holder 31 and the left holder 32 or may be accommodated in an enclosure that is formed as a member separate from the frame 3. In this case, the enclosure may be wired to the image display section 20 in the frame 3 via a cable, or they may be connected to each other over wireless communication.

The processing section 10 further includes the control section 140, an input information acquisition section 110, and a storage section 120.

The input information acquisition section 110 is connected to the operation section 111. The input information acquisition section 110 accepts the user's operation on the basis of a signal inputted via the operation section 111. The input information acquisition section 110 outputs data representing the content of the operation performed on the operation section 111 to the control section 140.

The processing section 10 further includes a power supply 113. The power supply 113, for example, includes a primary battery, a secondary battery, or a capacitor and supplies the portions that form the processing section 10 and the image display section 20 with electric power. The power supply state of the power supply 113 is controlled by the control section 140 in accordance with the operation of the power switch (not shown) and the execution state of a program executed by the control section 140.

The storage section 120 is a nonvolatile storage device and stores a variety of computer programs and data relating to the programs. The storage section 120 may further store data on still images and motion images to be displayed by the right display driver 22 and the left display driver 24.

The storage section 120 further stores setting data 121. The setting data 121 contains a variety of setting values used by the control section 140. The setting values contained in the setting data 121 may be values inputted by operation performed on the operation section 111 in advance or may be values received from an external apparatus (not shown) via the communication section 117 or from another device (not shown) and stored in the storage section 120.

The storage section 120 further stores input analysis data 122 and image data 123.

The control section 140 includes a CPU (not shown) that executes a program, a RAM (not shown) that temporarily stores the program executed by the CPU and data used by the CPU, and a ROM (not shown) that stores a basic control program executed by the CPU and data used by the CPU in a nonvolatile manner. The control section 140 reads and executes the computer programs stored in the storage section 120 to function as an operating system (OS) 150, the image processing section 160, the imaging control section 161, the input detection section 162, the input analysis section 163, the process execution section 164, the communication control section 170, and the display control section 190.

The imaging control section 161 controls the camera 61 to cause it to perform imaging for generation of captured image data and temporarily stores the captured image data in the storage section 120. In a case where the camera 61 is configured as a camera unit including a circuit that generates captured image data, the imaging control section 161 acquires the captured image data from the camera 61 and temporarily stores the captured image data in the storage section 120.

The image processing section 160 generates signals for image display on the basis of image data to be displayed by the right display driver 22 and the left display driver 24 and transmits the signals to the right display driver 22 and the left display driver 24. The signals generated by the image processing section 160 may be a vertical sync signal, a horizontal sync signal, a clock signal, an analog image signal, and other signals.

The image processing section 160 may perform, as required, resolution conversion in which the resolution of the image data is converted into resolution suitable for the right display driver 22 and the left display driver 24. The image processing section 160 may further perform image adjustment in which the luminance and chroma of the image data are adjusted, 2D/3D conversion in which 2D image data is created from 3D image data or 3D image data is created from 2D image data, and other types of image processing. Having performed the image processing described above, the image processing section 160 generates signals for displaying images on the basis of the processed image data and transmits the signals.

The display control section 190 produces control signals that control the right display driver 22 and the left display driver 24, and the control signals control the right display driver 22 and the left display driver 24 to cause them to produce and output image light. Specifically, the display control section 190 controls the right LCD control section 211 to cause it to start and stop driving the right LCD 241 and controls the right backlight control section 201 to cause it to start and stop driving the right backlight 221. The display control section 190 further controls the left LCD control section 212 to cause it to start and stop driving the left LCD 242 and controls the left backlight control section 202 to cause it to start and stop driving the left backlight 222.

The control section 140 displays an image based on content data (not shown) stored in the storage section 120, an image of a menu screen where setting of the HMD 100 is performed, and other images. The content data stored in the storage section 120 can be text data, still image data, motion image data, voice data, and other data. The control section 140 may cause the image display section 20 to display an image captured with the camera 61 or an image so generated from the captured image as to be displayed.

The control section 140 changes a display aspect of an on-display image in accordance with the user's operation detected with the external sensor 400 and the touchpads 401 and 402.

The control section 140 may further cause the image display section 20 to display an image superimposed on the real space visually recognized by the user in the form of the outside light OL passing through the right light guide 26 and the left light guide 28 (FIG. 1). In this case, the control section 140 detects a target object (real object) in the real space on the basis of an image captured with the camera 61 and identifies the position where the user visually recognizes the detected target object. The control section 140 determines a display position on each of the right LCD 241 and the left LCD 242 that corresponds to the position where the user visually recognizes the target object and displays a text or an image in the display position. The text or the image displayed by the image display section 20 is thus displayed in the position corresponding to the target object in the real space and therefore functions as an image that provides what is called an AR (augmented reality) effect (hereinafter referred to as AR image).

The HMD 100 may be connected to a variety of external apparatus (not shown) that serve as content supply sources. In this case, an interface that connects the external apparatus to the HMD 100 may be the communication section 117, or another interface may be provided as the connection interface. For example, an interface that supports wired connection, such as a USB interface, a micro-USB interface, and a memory card interface, may be provided. The external apparatus may each be an image supply apparatus that supplies the HMD 100 with images and are, for example, a personal computer (PC), a mobile phone terminal, and a portable game console.

The input detection section 162 causes the external sensor 400 and the touchpads 401 and 402 to operate to acquire detection values. The input detection section 162 detects an in-plane operation position, that is, an operation position in the X and Y directions on the touchpad 401, as labeled with the symbol A1 in FIG. 1. The input detection section 162 further detects an in-plane operation position, that is, an operation position in the X and Y directions on the touchpad 402. The input detection section 162 may instead acquire a detection value from each of the sensors 411, 412, 413, 421, 422, and 423 or may acquire detection values collectively from each of the right sensor section 410 and the left sensor section 420.

The input analysis section 163 analyzes the detection values acquired by the input detection section 162 to detect operation performed on the HMD 100.

Specifically, the input analysis section 163 detects an object located within the detection range of the external sensor 400 on the basis of detection values from the sensors 411, 412, and 413, which are provided in the right sensor section 410. The input analysis section 163 further detects operation performed on the left-eye-side display section of the HMD 100 on the basis of detection values from the sensors 421, 422, and 423 in the left sensor section 420. The input analysis section 163 thus detects that an operation body, such as the user's hand and an operation tool used by the user (glove, pointing rod, and writing tool, for example) has approached or come into contact with the frame 3 and detects operation performed by the operation body.

In this process, the input analysis section 163 may separately detect operation performed on the right-eye-side display section of the HMD 100 and operation performed on the left-eye-side display section of the HMD 100. The input analysis section 163 may instead detect operation performed on the entire HMD 100 on the basis of a result of the detection of operation performed on the right-eye-side display section and a result of the detection of operation performed on the left-eye-side display section of the HMD 100. For example, the input analysis section 163 may be so configured that in a case where both the sensor 411 and the sensor 421 detect an operation body, the input analysis section 163 can identify the operation as operation performed by a single operation body.

The input analysis section 163 may analyze detection values from the external sensor 400 to detect motion of an object located within the detection range of the external sensor 400.

The input analysis section 163 may determine a change in a detection value from each of the sensors in the external sensor 400 to detect motion of an object within the detection range, for example, by using a virtually set XYZ orthogonal coordinate system. In this case, the input analysis section 163 calculates motion of the object, for example, in the directions labeled with X, Y, and Z in FIG. 1. The X, Y, and Z directions have been described with reference to FIG. 1.

In the calculation of motion of the object within the detection range of the external sensor 400, the input analysis section 163 calculates the movement speed and/or the travel in each of the X, Y, and Z directions and generates data representing the calculated movement speed and/or travel. In this process, the input analysis section 163 may generate data representing whether the movement in each of the directions is the forward or reverse direction.

The input analysis section 163 generates data representing whether or not operation has performed on each of the touchpads 401 and 402, the operation position, the trajectory along which the operation position has moved, and other factors on the basis of a result of the detection performed by the touchpad 401 or 402. The input analysis section 163 may further detect operation of touching the touchpad 401 or 402 multiple times as single operation on the basis of a temporal change in the position of the contact operation detected with the touchpad 401 or 402. Specifically, the user's operation of tapping the touchpad 401 multiple times with an operation body may be detected as single operation. In this case, the input analysis section 163 may detect tapping operation repeated twice as single double-tapping operation and may detect tapping operation repeated three times as single triple-tapping operation. The same holds true for the touchpad 402.

In a case where an operation body having come into contact with the touchpad 401 or 402 moves with the contact with the touchpad maintained, the input analysis section 163 may determine the trajectory of the movement. In this case, the input analysis section 163 calculates motion of the object, for example, in the directions labeled with X and Y in FIG. 1. The input analysis section 163 generates data representing the operation position and the trajectory of the operation position on each of the touchpads 401 and 402 in the form of components in the X and Y directions. The generated data on the operation trajectory may contain the movement speed and the travel in the X and Y directions and may further represent whether the movement in each of the X and Y directions is forward-direction or reverse-direction movement.

The input analysis section 163 reads and uses the input analysis data 122 stored in the storage section 120 in the process of analyzing detection values from the external sensor 400 and the touchpads 401 and 402 to detect operation. The input analysis data 122 is data for determining the position and motion of an object on the basis of detection values from the external sensor 400. Specifically, the input analysis data 122 is data that relate detection values from the sensors in the external sensor 400, a temporal change in each of the detection values, combinations of the detection values from the sensors 411, 412, 413, 421, 422, and 423, and other factors to the position and motion of the object. The input analysis data 122 can be provided, for example, in the form of an arithmetic expression, parameters, a database that stores a plurality of parameters, or an LUT (lookup table) that includes a plurality of parameters and converts detection values into another type of data. The input analysis data 122 may instead be the combination of a detection value data processing program used by the input analysis section 163 and the detection value data. The input analysis data 122 may still instead be data separately prepared for each of the sensors 411, 412, 413, 421, 422, and 423. The input analysis data 122 may still instead be data separately prepared for the right sensor section 410 and the left sensor section 420 or data used in a case where detection values from the sensors 411, 412, 413, 421, 422, and 423 are integrally processed.

The input analysis data 122 may contain a parameter used in the process of determining the operation position where contact operation is performed and the trajectory of the operation position on the basis of detection values from the touchpad 401 or 402.

The input analysis section 163 can detect operation performed multiple times on the external sensor 400 or the touchpad 401 or 402 as single operation or a series of acts of operation, as described above. The input analysis section 163 can therefore detect single operation formed of a plurality of acts of touching operation and operation of moving an operation body in a specific aspect. Specifically, the input analysis section 163 can detect any of double-tapping operation and triple-tapping operation performed on the touchpads 401 and 402 and gesture operation of moving an operation body as single operation. The user can therefore perform a variety of types of operation on the HMD 100.

The process execution section 164 executes a process corresponding to operation detected by the input analysis section 163. For example, when operation is performed and detected by the input analysis section 163, the process execution section 164 executes the process of displaying a menu image on the basis of the image data 123 stored in the storage section 120. The image data 123 is one of the content data sets described above and may contain not only the menu image but also image data on a variety of images displayed under the control of the control section 140.

The process execution section 164 acquires the data generated by the input analysis section 163 and identifies operation performed on the external sensor 400 or the touchpad 401 or 402. The process execution section 164 can therefore execute a process set in correspondence with complicated operation formed of operation performed multiple times on the external sensor 400 and the touchpads 401 and 402.

A process to be executed by the process execution section 164 can be specified, for example, by the setting data 121. In this case, the setting data 121 contains data that relate operation detected by the input analysis section 163 to a process executed by the process execution section 164.

The control section 140 switches the action mode of the HMD 100 between a normal action mode and a proximity operation mode and activates the selected mode. The normal action mode is an action mode in which the HMD 100 acts in accordance with operation performed on the touchpads 401 and/or 402. In the normal action mode, the control section 140 does not execute a process that responds to operation performed on the external sensor 400.

In the normal action mode, the control section 140, for example, does not allow the input detection section 162 to perform detection using the external sensor 400, or the input analysis section 163 does not analyze a detection value acquired by the input detection section 162. Further, among a variety of types of operation analyzed by the input analysis section 163, the process execution section 164 does not execute a process corresponding to operation associated with the external sensor 400. Any of the action states described above may be achieved, and the configuration in which the input detection section 162 restricts detection performed by the external sensor 400 allows advantageous reduction in power consumption. Further, the restriction of execution of processes executed by the input analysis section 163 or the process execution section 164 described above is advantageous in that the normal action mode can be quickly switched to the proximity operation mode, which will be described below.

The proximity operation mode is an action mode in which the external sensor 400 detects operation. That is, the proximity operation mode is an action mode in which the user can cause an operation body to approach the external sensor 400 and operate the operation body.

In the proximity operation mode, an object located in the detection range of any of the right sensor section 410 and the left sensor section 420 is detected, and the input detection section 162 and the input analysis section 163 act as described above to detect operation.

The normal action mode, in which a process corresponding to operation performed on the external sensor 400 is restricted, prevents wrong action in response to wrong operation or unintended operation. For example, a situation in which the user unintendedly causes an object to approach the external sensor 400 and the control section 140 changes a displayed content accordingly can be avoided. On the other hand, the proximity operation mode allows the user to cause an object to approach the external sensor 400 and therefore allows the user to more readily perform a variety of types of operation on the HMD 100. Switching the action mode of the HMD 100 between the normal action mode and the proximity operation mode will be described later with reference to a flowchart.

The detection range over which the external sensor 400 detects approach of an object to the HMD 100 can be arbitrarily set. For example, the detection range only needs to be a range that allows detection of approach of an object to the vicinity of a display section of the HMD 100. The display section refers, for example, to a front surface portion of the frame 3 where the image display section 20 is disposed, the right light guide 26 and the left light guide 28, each of which displays an image, and a front surface portion of the frame 3 where the right light guide 26 and the left light guide 28 are held. As illustrated in FIGS. 1 and 2, the external sensor 400 includes the right sensor section 410 and the left sensor section 420, which are capable of detection of approach and contact of an object to and with the front surface portions (front portions) of the frame 3, and each of the sensors in the sensor sections can detect approach of an object in the proximity operation mode.

In the proximity operation mode, a process executed by the input detection section 162, which will be described later, allows detection of presence or absence of an object in the detection range of each of the sensors in the external sensor 400 on the basis of a detection value from the sensor. The input detection section 162 may further detect approach and separation of an object in the detection range and entry and exit of an object into and out of the detection range.

The distance over which the external sensor 400 detects approach of an object, that is, the detection range of the external sensor 400 is specifically a range over which each of the sensors 411, 412, and 413 and the sensors 421, 422, and 423 detects an object that is not in contact therewith and can be expressed by the distance from each of the sensors. The distance may be fixed or variable. Each of the touchpads 401 and 402 may also serve as a sensor that detects approach of an object in the proximity operation mode.

For example, the detection range of each of the sensors in the external sensor 400 may range from 1 to 2 cm from a contact position (surface of sensor or surface of frame 3, for example) or may range from about 2 to 5 cm therefrom. In the proximity operation mode, the detection range may be changed under the control of the input detection section 162.

A specific method for changing the detection range may, for example, be a method for switching a process in which the input detection section 162 analyzes a detection value outputted by each of the sensors in the external sensor 400 to another. Instead, a method for changing a setting value of a circuit that drives each of the sensors in the external sensor 400 or changing detection conditions under which each of the sensors is driven, such as current, voltage, and pulse frequency, may be employed.

A GPS 115 and the communication section 117 are connected to the control section 140.

The GPS 115 includes an antenna (not shown) and receives GPS (global positioning system) signals to calculate the current position of the processing section 10. The GPS 115 outputs the current position and current time determined on the basis of the GPS signals to the control section 140. The GPS 115 may have the function of acquiring the current time on the basis of information contained in the GPS signals to correct the time measured by the control section 140.

The communication section 117 performs wireless data communication that complies with a wireless LAN (WiFi (registered trademark)), Miracast (registered trademark), Bluetooth (registered trademark), or any other standard.

The HMD 100 may include a microphone (not shown) that collects voice. The HMD 100 may further include a headphone or a loudspeaker that outputs voice. In this case, control section 140 has the function of acquiring data on the voice collected with the microphone and the function of outputting a voice signal on the basis of the voice data. The microphone is connected to a circuit (not shown) that outputs a voice signal carrying collected voice to the control section 140. Further, for example, the loudspeaker or the headphone is connected to an amplifier (not shown) that amplifies the voice signal outputted by the control section 140 and outputs voice on the basis of the amplified voice signal. In this case, the control section 140 allows the user to listen voice based on voice data contained in content data. The control section 140 can change a display content or execute any other process on the basis of the voice collected with the microphone. The control section 140 may include a voice processing section as a processing section that executes the processes described above.

Figure 6:
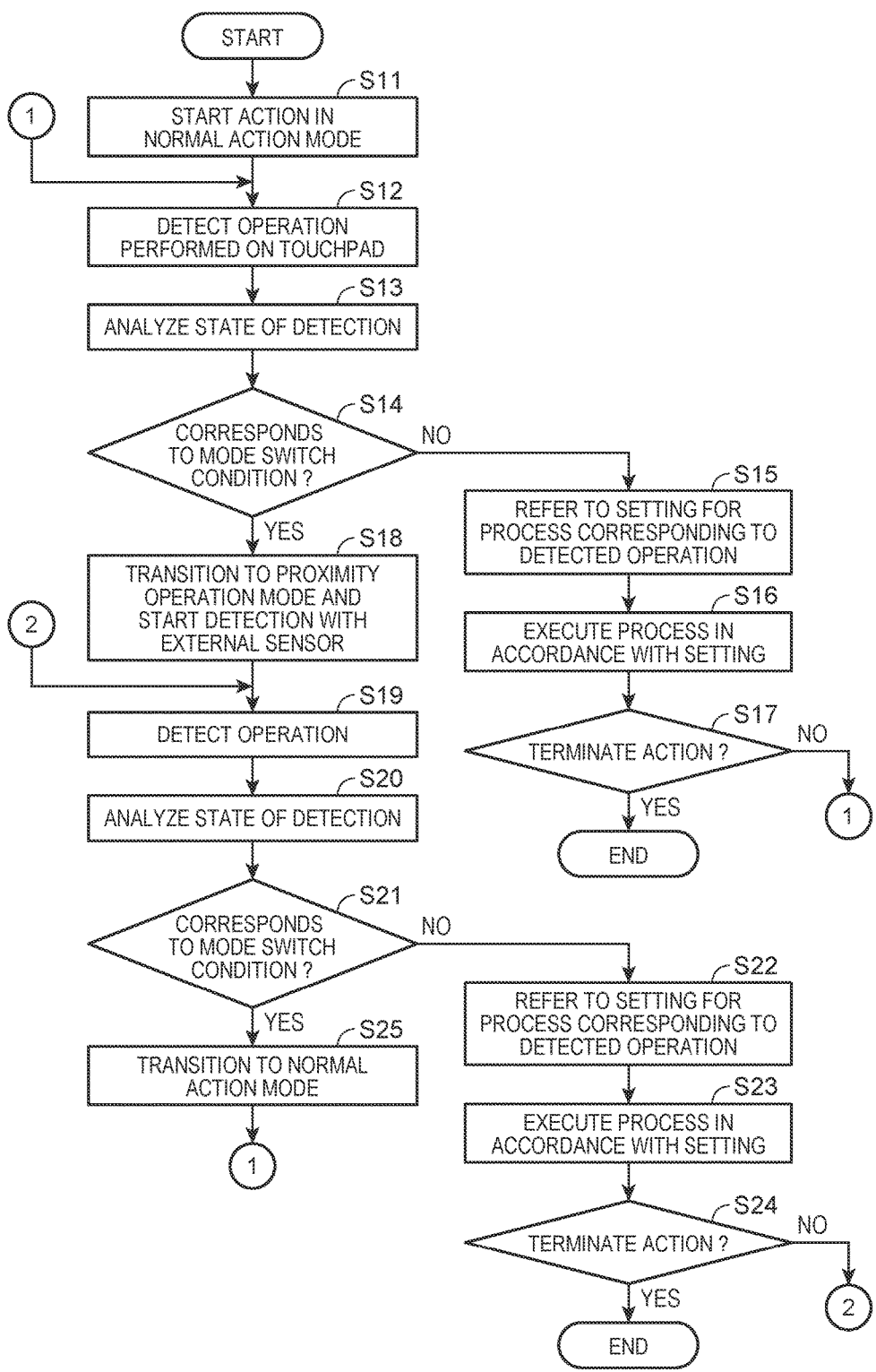
FIG. 6 is a flowchart showing the action of the HMD.

FIG. 6 is a flowchart showing the action of the HMD 100.

After the HMD 100 is powered on, the control section 140 starts operating in the normal action mode (step S11).

In the control section 140, when the input detection section 162 detects operation performed on the touchpads 401 and/or 402 (step S12), the input analysis section 163 analyzes the operation and identifies the state of the operation (S13). At this point, the process execution section 164 evaluates whether or not the state of the operation identified by the input analysis section 163 corresponds to operation of instructing switch of the action mode (step S14).

In a case where the state of the operation does not correspond to operation of instructing switch of the action mode (NO in step S14), the process execution section 164 refers to the setting data 121 and acquires a setting for the process corresponding to the state of the operation identified in step S13 by the input analysis section 163 (step S15). The process execution section 164 executes the set process (step S16), and the control section 140 then evaluates whether or not the action should be terminated (step S17). In a case where a result of the evaluation shows that the action should be terminated (YES in step S17), for example, in a case where the power switch is operated, the control section 140 terminates the present process procedure. In a case where the action is not terminated (NO in step S17), the process execution section 164 returns to step S12.

In the case where a result of the evaluation shows that the state of the operation identified by the input analysis section 163 corresponds to operation of instructing switch of the action mode (YES in step S14), the process execution section 164 transitions to the proximity operation mode (step S18). In step S18, the process execution section 164 transitions to a state in which it can execute a process in accordance with operation performed on the external sensor 400. Specifically, for example, the external sensor 400 starts detection under the control of the input detection section 162, or the input analysis section 163 starts analysis.

Thereafter, when the input detection section 162 detects operation performed on the external sensor 400 or the touchpad 401 or 402 (step S19), the input analysis section 163 analyzes the operation to identify the state of the operation (step S20). At this point, the process execution section 164 evaluates whether or not the state of the operation identified by the input analysis section 163 corresponds to operation of instructing switch of the action mode (step S21).

In a case where the state of the operation does not correspond to operation of instructing switch of the action mode (NO in step S21), the process execution section 164 refers to the setting data 121 and acquires a setting for the process corresponding to the state of the operation identified in step S20 by the input analysis section 163 (step S22). The process execution section 164 executes the set process (step S23), and the control section 140 then evaluates whether or not the action should be terminated (step S24). In a case where a result of the evaluation shows that the action should be terminated (YES in step S24), the control section 140 terminates the present process procedure. In a case where the action is not terminated (NO in step S24), the process execution section 164 returns to step S19.

In the case where a result of the evaluation shows that the state of the operation identified by the input analysis section 163 corresponds to operation of instructing switch of the action mode (YES in step S21), the process execution section 164 transitions to the normal action mode (step S25) and returns to step S12.

The operation of instructing switch of the action mode is, for example, double-tapping operation performed on the touchpad 401 or 402. The switching from the normal action mode to the proximity operation mode and the switching from the proximity operation mode to the normal action mode may be performed by the same operation of instructing switch of the action mode. In this case, to achieve operation detectable both in the normal action mode and the proximity operation mode, it is preferable to employ operation performed both on the touchpads 401 and 402.

In the normal action mode, no process corresponding to operation performed on the external sensor 400 is executed. However, only action mode switch instructing operation performed on the external sensor 400 may be detected for switch of the action mode.

A description will be made of specific examples of display aspect changing action of the process execution section 164 corresponding to operation performed on the external sensor 400.

Figure 7A:
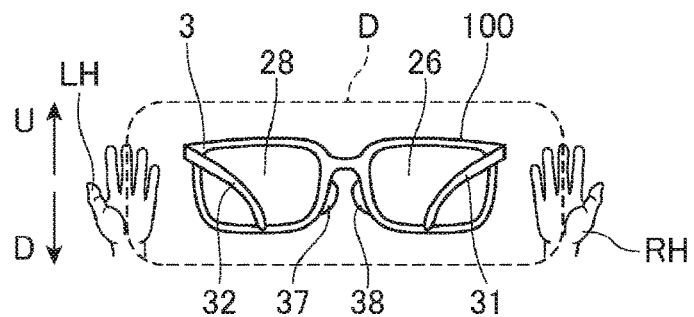
FIGS. 7A to 7D show specific examples of the aspect of operation performed on the HMD and a displayed content corresponding thereto.
Figure 7B:
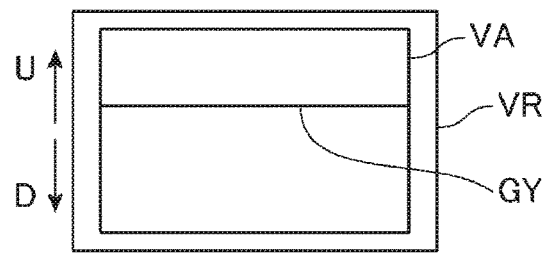
Figure 7C:
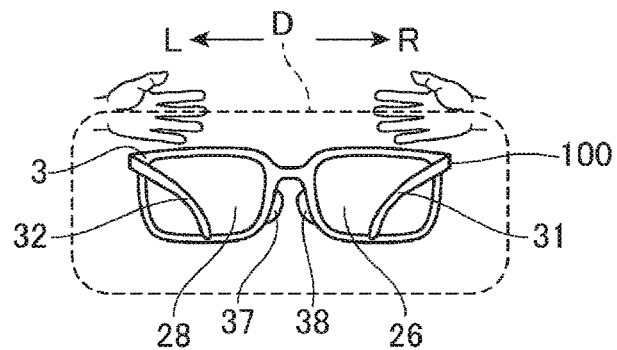
Figure 7D:
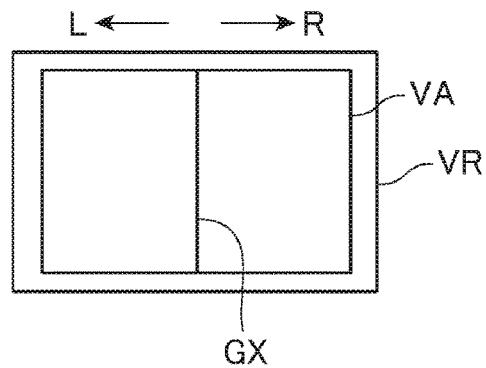

FIGS. 7A to 7D show specific examples of the aspect of operation performed on the HMD 10 and a displayed content. FIG. 7A shows an example of the operation, and FIG. 7B shows an example of the displayed content corresponding to the operation in FIG. 7A. FIG. 7C shows another example of the operation, and FIG. 7D shows an example of the displayed content corresponding to the operation in FIG. 7C.

FIG. 7A shows a state in which two operation bodies are brought to positions in proximity to the opposite sides of the HMD 100, more specifically, a state in which two operation bodies RH and LH are brought to a position in proximity to the HMD 100 with the operation bodies separate away from each other on the right and left sides. For example, the operation body RH is the user's right hand, and the operation body LH is the user's left hand. The operation bodies RH and LH are not necessarily located on the opposite sides of the HMD 100 and may be located in front of the right light guide 26 and the left light guide 28, respectively. FIG. 7A shows the rear side of the HMD 100, that is, the HMD 100 viewed from the side facing the face of the user on whom the HMD 100 is mounted for ease of understanding.

As indicated by the symbol D in FIGS. 7A and 7C, the detection range D of the external sensor 400 lies in the space that spreads forward, upward, downward, rightward, and leftward with respect to the right light guide 26 and the left light guide 28.

The operation in FIG. 7A shows operation of bringing the operation bodies RH and LH to positions in proximity to the right light guide 26 and the left light guide 28, respectively, and then moving the operation bodies in the upward direction U or the downward direction D. In this case, the input analysis section 163 detects the operation body RH via the right sensor section 410 of the external sensor 400 and the operation body LH via the left sensor section 420 of the external sensor 400. When each of the right sensor section 410 and the left sensor section 420 detects one object, the process execution section 164 displays, as set action, a Y-direction guide GY for position input (operation control command image). FIG. 7B shows that the Y-direction guide GY is displayed in a display region VA in the user's field of view VR. The display region VA represents the maximum range where the user visually recognizes virtual images formed by the right light guide 26 and the left light guide 28. In practice, the display region VA is a region where a virtual image visually recognized by the user's right eye and a virtual image visually recognized by the user's left eye are combined with each other by the user's visual function. In the description, however, the display region VA is drawn in the form of one rectangle in the sense that it represents an image visually recognized by the user.

The Y-direction guide GY is a guide that allows operation of inputting a position in the vertical direction, that is, the Y direction, and the Y-direction guide GY is, for example, a straight line extending in the horizontal direction in the display region VA.

The process execution section 164 displays the Y-direction guide GY in the display region VA, and when the input analysis section 163 detects movement of the operation bodies RH and LH in the upward direction U, the process execution section 164 moves the Y-direction guide GY in the upward direction U in such a way that the Y-direction guide GY follows the movement of the operation bodies in the upward direction U. On the other hand, when the input analysis section 163 detects movement of the operation bodies RH and LH in the downward direction D, the process execution section 164 moves the Y-direction guide GY in the downward direction D in such a way that the Y-direction guide GY follows the movement of the operation bodies in the downward direction D. The correspondence between the travel of the operation bodies RH and LH detected by the input analysis section 163 and the travel of the Y-direction guide GY is set in advance in the setting data 121.

The HMD 100 allows the user to input a position in the Y direction when the user places the right hand on the right eye side and the left hand on the left eye side and moves the hands toward the frame 3, as shown in FIGS. 7A and 7B. When the user moves the Y-direction guide GY to a desired position and then moves the operation bodies RH and LH in a predetermined aspect, the position in the Y direction is finalized. Examples of the predetermined aspect may include action of bringing the operation bodies RH and LH to a halt for a predetermined period and action of moving both the operation bodies RH and LH in parallel to the horizontal direction, that is, the X direction (rightward direction R or leftward direction L in FIG. 7C). In a case where the operation bodies RH and LH are caused to be in contact with the frame 3 during the movement of the operation bodies RH and LH in the upward direction U or the downward direction D, the position in the Y direction may be finalized by causing the operation bodies RH and LH to move away from the frame 3.

The operation in FIG. 7C shows operation of bringing the operation bodies RH and LH to a position in proximity to the frame 3 and moving the operation bodies in the rightward direction R or the leftward direction L. In this case, the input analysis section 163 detects the operation body RH via the right sensor section 410 of the external sensor 400 and the operation body LH via the left sensor section 420 of the external sensor 400. After the position in the Y direction is finalized by the operation shown in FIG. 7A, and when each of the right sensor section 410 and the left sensor section 420 detects one object, the process execution section 164 displays, as set action, an X-direction guide GX for position input (operation control command image).

FIG. 7D shows that the X-direction guide GX is displayed in the display region VA in the user's field of view VR. The X-direction guide GX is a guide that allows operation of inputting a position in the horizontal direction, that is, the X direction, and the X-direction guide GX is, for example, a straight line extending in the vertical direction in the display region VA.

The process execution section 164 displays the X-direction guide GX in the display region VA, and when the input analysis section 163 detects movement of the operation bodies RH and LH in the rightward direction R, the process execution section 164 moves the X-direction guide GX in the rightward direction R in such a way that the X-direction guide GX follows the movement of the operation bodies in the rightward direction R. On the other hand, when the input analysis section 163 detects movement of the operation bodies RH and LH in the leftward direction L, the process execution section 164 moves the X-direction guide GX in the leftward direction L in such a way that the X-direction guide GX follows the movement of the operation bodies in the leftward direction L. The correspondence between the travel of the operation bodies RH and LH detected by the input analysis section 163 and the travel of the X-direction guide GX is set in advance in the setting data 121.

The HMD 100 allows the user to input a position in the X direction when the user places the right hand on the right eye side and the left hand on the left eye side and moves the hands toward the frame 3, as shown in FIGS. 7C and 7D. When the user moves the X-direction guide GX to a desired position and then moves the operation bodies RH and LH in a predetermined aspect, the position in the X direction is finalized. Examples of the predetermined form may include action of bringing the operation bodies RH and LH to a halt for a predetermined period and moving both the operation bodies RH and LH in parallel to the vertical direction, that is, the Y direction (upward direction U or downward direction D), as in the position input using the Y-direction guide GY. In a case where the operation bodies RH and LH are caused to be in contact with the frame 3 during the movement of the operation bodies RH and LH in the rightward direction R or the leftward direction L, the position in the X direction may be finalized by causing the operation bodies RH and LH to move away from the frame 3.

The examples shown in FIGS. 7A to 7D can be used in the user's position input operation of inputting or specifying a position in the field of view VR. The position inputted on the basis of the positions of the X-direction guide GX and the Y-direction guide GY is detected, for example, by the input analysis section 163 as a position in the field of view VR. In this case, the input analysis section 163 may convert the detected position into the coordinates of the positions displayed on the right LCD 241 and the left LCD 242.

A trigger for display of the Y-direction guide GY and the X-direction guide GX for initiation of position input may be detection of contact of two objects with the external sensor 400 or detection of contact of two objects with the external sensor 400 and then removal of the contact of one of the objects. That is, the process execution section 164 may execute a process in correspondence with the combination of operation of causing an operation body to come into contact with the external sensor 400 and operation of bringing the operation body to a position in proximity to the external sensor 400 within the detection range thereof. Further, when the Y-direction guide GY and the X-direction guide GX are displayed, a text or an image that guides a method for operating the guides may be displayed under the control of the process execution section 164.

The operation shown in FIGS. 7A to 7D may be performed with one hand. The one-hand operation corresponds, for example, to a case where the input analysis section 163 detects approach in the two positions via one of the right sensor section 410 and the left sensor section 420 of the external sensor 400. In this case, the process execution section 164 displays, as set action, the Y-direction guide GY for position input (operation control command image). For example, the case described above corresponds to a case where the index finger and the middle finger of the user's right hand are detected as operation bodies.

The process execution section 164 detects operation of moving the two operation bodies (index finger and middle finger of right hand) upward or downward (in Y direction in FIG. 1) with the Y-direction guide GY displayed, as shown in FIG. 7B, and moves the Y-direction guide GY upward or downward in correspondence with the operation body moving operation. The correspondence between the travel of the two operation bodies detected by the input analysis section 163 and the travel of the Y-direction guide GY is set in advance in the setting data 121. Thereafter, when the input analysis section 163 detects that one of the two operation bodies moves away from the frame 3 by a predetermined distance, the position in the Y direction is finalized.

Further, in a case where the input analysis section 163 detects approach in the two positions via one of the right sensor section 410 and the left sensor section 420 of the external sensor 400, the process execution section 164 displays the X-direction guide GX for position input (operation control command image). For example, the case described above corresponds to a case where the index finger and the middle finger of the user's right hand are detected as operation bodies.

The process execution section 164 detects operation of moving the two operation bodies (index finger and middle finger of right hand) rightward or leftward (in Z direction in FIG. 1) with the X-direction guide GX displayed, as shown in FIG. 7D, and moves the X-direction guide GX rightward or leftward in correspondence with the operation body moving operation. The correspondence between the travel of the two operation bodies detected by the input analysis section 163 and the travel of the X-direction guide GX is set in advance in the setting data 121. Thereafter, when the input analysis section 163 detects that one of the two operation bodies moves away from the frame 3 by a predetermined distance, the position in the X direction is finalized.

The operation described above but so performed that the two operation bodies are moved in the X direction in FIG. 1 may be applicable to position input in the depth direction of the user's visual field viewed through the frame 3.

Figure 8A:
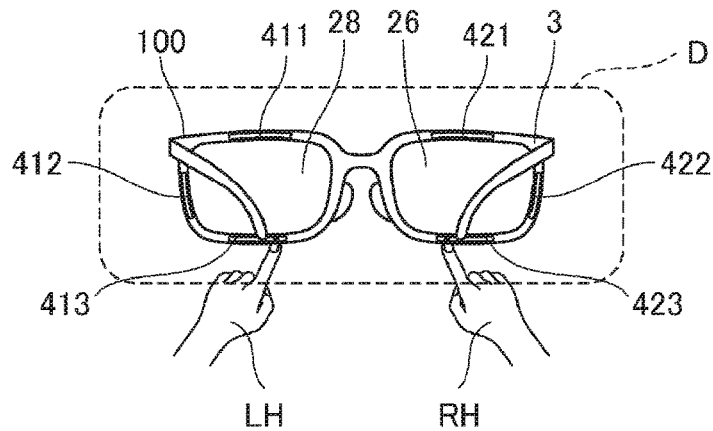
FIGS. 8A to 8c show a specific example of the aspect of operation performed on the HMD and a displayed content corresponding thereto.
Figure 8B:
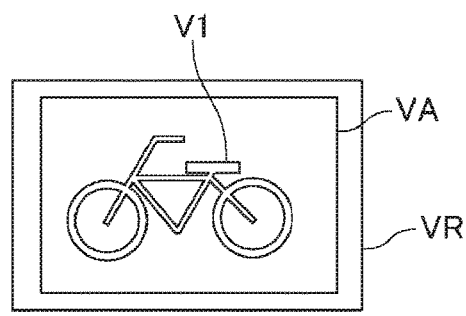
Figure 8C:
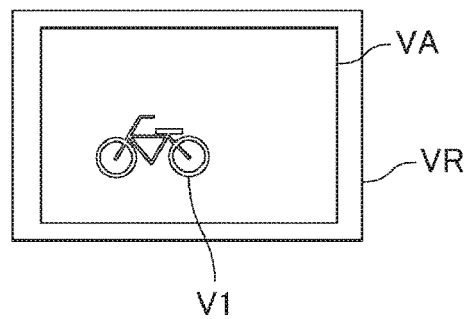

FIGS. 8A to 8C show a specific example of the aspect of operation performed on the HMD 100 and a displayed content corresponding thereto. FIG. 8A shows an example of the operation, and FIGS. 8B and 8C show examples of the displayed content corresponding to the operation shown in FIG. 8A.

FIG. 8A shows a state in which two operation bodies in front of the HMD 100 are brought to a position in proximity to the HMD 100, more specifically, a state in which the two operation bodies RH and LH are brought to a position in proximity to the front side of the right light guide 26 and the left light guide 28 with the operation bodies RH and LH separate away from each other on the right and left sides. In the example shown in FIG. 8A, the operation body RH is in proximity to the sensor 413, and the operation body LH is in proximity to the sensor 423. FIG. 8A shows the rear side of the HMD 100, that is, the HMD 100 viewed from the side facing the face of the user on whom the HMD 100 is mounted for ease of understanding.

As indicated by the symbol D in FIG. 8A, the detection range D of the external sensor 400 lies in the space that spreads forward, upward, downward, rightward, and leftward with respect to the right light guide 26 and the left light guide 28.

The operation FIG. 8A shows operation of moving the operation body RH along the sensor 413 and moving the operation body LH along the sensor 423. In this case, the input analysis section 163 detects the operation body RH and the movement thereof via the sensor 413 in the right sensor section 410 and detects the operation body LH and the movement thereof via the sensor 423 in the left sensor section 420.

In a case where the sensors provided in the external sensor 400 (six sensors in the present embodiment) detect two objects and further detect operation of causing the two objects to approach or move away from each other, the process execution section 164 performs, as set action, enlargement or reduction of a displayed content.

In FIGS. 8B and 8C, a display image V1 is displayed in the user's field of view VR. In a case where the input analysis section 163 detects operation of causing the two objects to move away from each other as operation performed on the external sensor 400, the process execution section 164 enlarges the image being displayed. For example, the process execution section 164 changes the display magnification of the display image V1 in FIG. 8C and causes the display state in FIG. 8C to transition to the display state in FIG. 8B. On the other hand, in a case where the input analysis section 163 detects operation of causing the two objects to approach each other as operation performed on the external sensor 400, the process execution section 164 reduces the image being displayed. For example, the process execution section 164 changes the display magnification of the display image V1 in FIG. 8B and causes the display state in FIG. 8B to transition to the display state in FIG. 8C.

The correspondence between the amount of change in the distance between the two objects detected with the external sensor 400 and the amount of change in the display magnification or the display size of the display image V1 is set in advance in the setting data 121.

In the HMD 100, the display size of the display image V1 can be changed by the user's operation of causing the hands to approach the frame 3 to allow the hands to be detected as at least two objects and causing the two objects to approach each other or move away from each other, as shown in FIGS. 8A to 8C. The operation is not limited to the case where one sensor keeps detecting an object. For example, an object may be present within the detection ranges of the sensors 411, 412, and 413 and therefore detected therewith. In this case, the input analysis section 163 only needs to analyze detection values from adjacent sensors that continuously detect the object to detect operation of moving the single object over the detection ranges of the different sensors. Instead, the two objects may be detected under a condition that the right sensor section 410 detects one of the objects and the left sensor section 420 detects the other, or no condition may be imposed on a sensor that detects an object. For example, in a case where the input analysis section 163 is configured to be capable of detecting two objects via one sensor, approach or separation associated with the two objects and detected with the one sensor may be detected. Therefore, for example, the user may change the display size of the display region VA by using the user's one hand to perform operation of bringing two fingers to a position in proximity to the frame 3 and causing the two fingers to approach or move away from the frame 3.

In a case where the external sensor 400 detects two operation bodies, as shown in FIG. 8A, the display image V1 may be rotated in correspondence with operation of rotating the two operation bodies. In this situation, in a case where the positions where the two operation bodies are detected move relative to each other, and one of the detection positions moves by a greater amount than the amount by which the other detection position moves, the input analysis section 163 may determine that the operation bodies have rotated. The angle of rotation of the display image V1 may be determined in accordance with the degree of the rotation of the operation bodies or the rotation speed thereof. Further, for example, in a case where the operation positions have hardly moved, but the operation bodies have rotated multiple times, the angle of rotation may be determined by the number of rotations.

As other types of operation performed on the display image V1 in the display region VA, the following examples are conceivable.

1. Enlargement/reduction and rotation: The external sensor 400 detects contact or proximity of two points, and one of the two points is caused to come into contact with any of the sensors in the right sensor section 410 while rotated right-handed relative to the frame 3. At this point, any of the sensors detects contact or proximity of the other point. In correspondence with the operation described above, the process execution section 164 rotates the display image V1 while enlarging it. The one point may instead be rotated left-handed in the operation described above to allow the process execution section 164 to rotate the display image V1 while reducing it.

2. Enlargement/reduction and rotation: In the case where the external sensor 400 detects contact or approach of two points for enlargement/reduction of the display image V1, another operation body is located outside the field of view VR, and the display image V1 is rotated by the amount according to the angle or speed of rotation of the operation body.

3. The display image V1 may be enlarged in accordance with operation of causing an operation body to approach the external sensor 400 within the detection range thereof, and the display image V1 may be reduced in accordance with operation of causing the operation body to move away from the external sensor 400 within the detection range thereof. The operation of causing the operation body to approach or move away from the external sensor 400 may be combined with operation of causing another operation body to come into contact with any of the sensors in the external sensor 400.

Figure 9A:
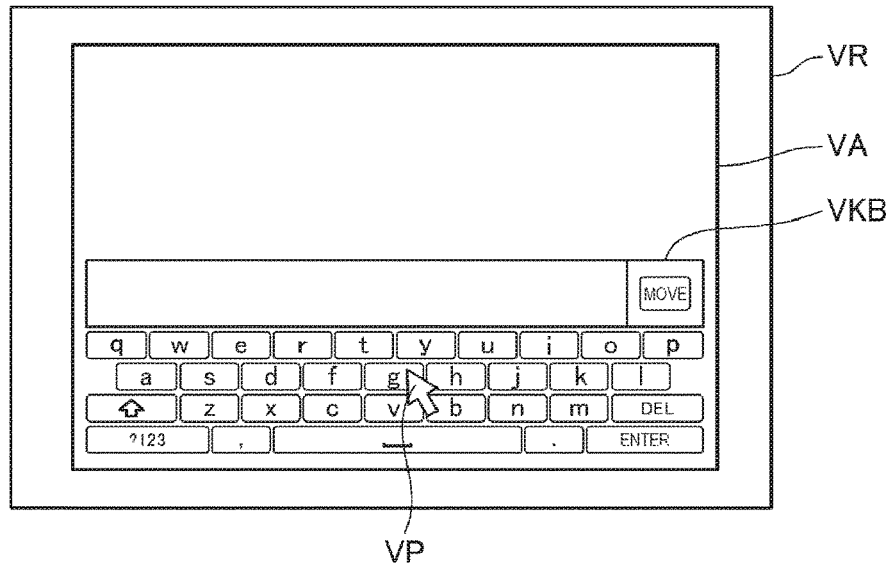
FIGS. 9A and 9B show a specific example of the aspect of operation performed on the HMD and a displayed content corresponding thereto.
Figure 9B:
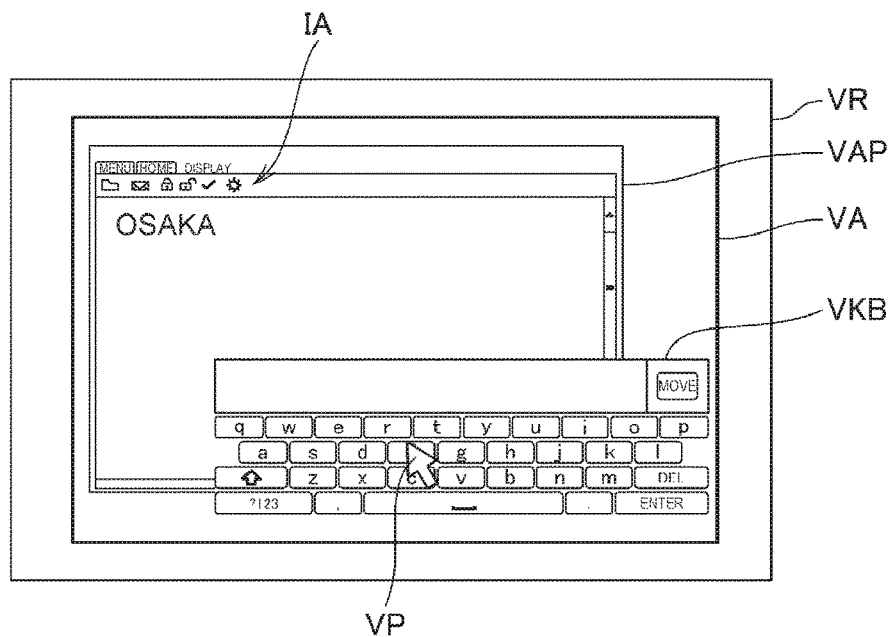

FIGS. 9A and 9B show another specific example of the aspect of operation performed on the HMD 100 and a displayed content corresponding thereto. FIGS. 9A and 9B show an example of input operation using a virtual keyboard VKB.

FIGS. 9A and 9B show a state in which the virtual keyboard VKB is invoked in response to operation performed on the external sensor 400 or the touchpad 401 or 402. The virtual keyboard VKB is an image having the shape of a keyboard having a plurality of input keys, and the image display section 20 displays the virtual keyboard VKB in the display region VA. In the state in which the virtual keyboard VKB is displayed and visually recognized, when the user performs operation of inputting a position in the display region VA, a pointer VP is displayed in the inputted position. At this point, when the user performs finalization operation, the key with which the pointer VP overlaps is selected, and the character on the key is inputted. The operation of specifying the position of the pointer VP can, for example, be the position input operation described with reference to FIGS. 7A to 7C.

FIG. 9B shows an example in which an application screen VAP is displayed along with the virtual keyboard VKB. The application screen VAP is, for example, a screen where a document is edited by using an application program executed by the control section 140. The application screen VAP is a screen corresponding to a process executed by the user in an application program. In a case where the application program allows GUI operation, operation of selecting any of icons placed in an icon placement section IA and other types of operation are performed.

In the example in FIG. 9B, operation of selecting any of the keys of the virtual keyboard VKB and operation of selecting any of the icons placed in the icon placement section IA in the application screen VAP are performed. In either operation, the position input operation can be used. Further, a first state in which the virtual keyboard VKB is operated and a second state in which the application screen VAP is operated can be switched from one to the other by operation using the external sensor 400.

The first state and the second state may be switched from one to the other, for example, by operation of covering the right sensor section 410 or the left sensor section 420 with an operation body, such as the user's hand. In this case, the input analysis section 163 detects the operation of covering the right sensor section 410 or the left sensor section 420 on the basis of detection values representing that the sensors in the right sensor section 410 have detected the object roughly at the same time or detection values representing that the sensors in the left sensor section 420 have detected the object roughly at the same time. Instead, the first state and the second state may be switched from one to the other by double-tapping operation performed on the touchpad 401 or 402.

In the example shown in FIGS. 9A and 9B, the process execution section 164 may increase or decrease the display size of the virtual keyboard VKB by the operation described with reference to FIGS. 8A to 8C. Further, the process execution section 164 may rotate the virtual keyboard VKB, change the arrangement of the keys of the virtual keyboard VKB, change the type of the keyboard (such as Japanese input keyboard, English input keyboard, and numeric keys), and make other changes.

After a letter is inputted by use of the virtual keyboard VKB in FIG. 9A, the inputted letter or letter string may be transferred to and processed by an application program. Examples of operation of instructing selection of an application program to which the letter or the letter string is transferred and instructing the transfer may include operation of causing an operation body to approach the external sensor 400 and operation of moving the operation body in a predetermined aspect within the detection range of the external sensor 400.

Further, when the virtual keyboard VKB is about to be displayed, and when the virtual keyboard VKB and the application screen VAP are displayed or switched from one to the other, an operation guiding image or text may be displayed in the form of a popup or a balloon.

Figure 10:
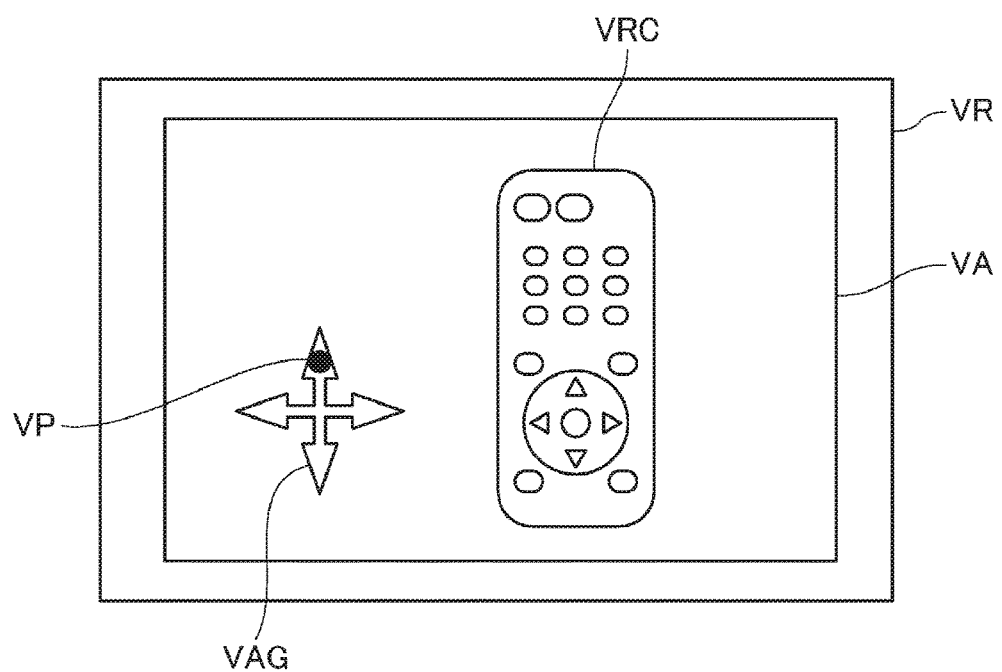
FIG. 10 shows a specific example of the aspect of operation performed on the HMD and a displayed content corresponding thereto.

FIG. 10 shows another specific example of the aspect of operation performed on the HMD 100 and a displayed content corresponding thereto and shows an example of input operation using a virtual remote control VRC.

FIG. 10 shows a state in which the virtual remote control VRC is invoked in response to operation performed on the external sensor 400 or the touchpad 401 or 402. The virtual remote control VRC is an image that mimics a remote control having a plurality of input keys and used to operate a household appliance and an AV (audio visual) apparatus. The virtual remote control VRC has a plurality of operation switches disposed thereon, as a real remote control does. In the state in which the virtual remote control VRC is displayed, any of the operation switches of the virtual remote control VRC can be selected by the position input operation described above.

The display size of the virtual remote control VRC can be increased and decreased by the operation of instructing enlargement/reduction of the display image V1 described above. Further, the display angle of the virtual remote control VRC can be changed, that is, the virtual remote control VRC can be rotated by the operation of instructing rotation of the display image V1 described above.

FIG. 10 further shows a displayed direction indicating guide VAG. The direction indicating guide VAG is an image that allows the user to perform operation of indicating any of the four directions corresponding to the upward, downward, rightward, and leftward directions. Any of the upward, downward, rightward, and leftward directions can be indicated by the position input operation described above and performed on the direction indicating guide VAG.

In the state shown in FIG. 10, a circular pointer VP is displayed in a position indicated by the position input operation, and the pointer VP guides the position input operation performed on the virtual remote control VRC and the direction indicating guide VAG The display of the virtual remote control VRC and the direction indicating guide VAG can be initiated by the same operation that displays the virtual keyboard VKB described above or menu operation, which will be described later.

When any of the operation switches of the virtual remote control VRC is selected by the position input operation, the process execution section 164 controls the communication section 117 to cause it to transmit a signal to an external apparatus operated by the virtual remote control VRC. The external apparatus to be operated is, for example, a household appliance and an AV apparatus, as described above, but not necessarily, and may be any apparatus that can be controlled or operated with a wireless signal. The communication section 117 may instead transmit a wireless signal that complies with a wireless LAN, Bluetooth, or any other standard under the control of the process execution section 164. Further, in a case where the communication section 117 includes an IR transmitter (not shown) that transmits an infrared signal, the communication section 117 may transmit the infrared signal to an apparatus to be operated under the control of the process execution section 164.

In the HMD 100, the camera 61 can perform imaging in the direction of the user's line of sight. In this case, operation using the external sensor 400 can instruct the camera 61 to perform imaging.

Specifically, the process execution section 164 instructs the camera 61 to perform focus adjustment in accordance with operation of causing an operation body to be in contact with the external sensor 400 at least for a predetermined period or operation of covering the right sensor section 410 or the left sensor section 420. When at least a predetermined number of sensors provided in the external sensor 400 detect contact or proximity of an operation body roughly at the same time, the input analysis section 163 may detect the operation of covering the right sensor section 410 or the left sensor section 420. When the operation is completed and the same operation is performed again, shutter operation of the camera 61 (imaging) may be performed. Further, zoom adjustment of the camera 61 may be performed by the operation of enlarging/reducing the display image V1 described above.

Figure 11A:
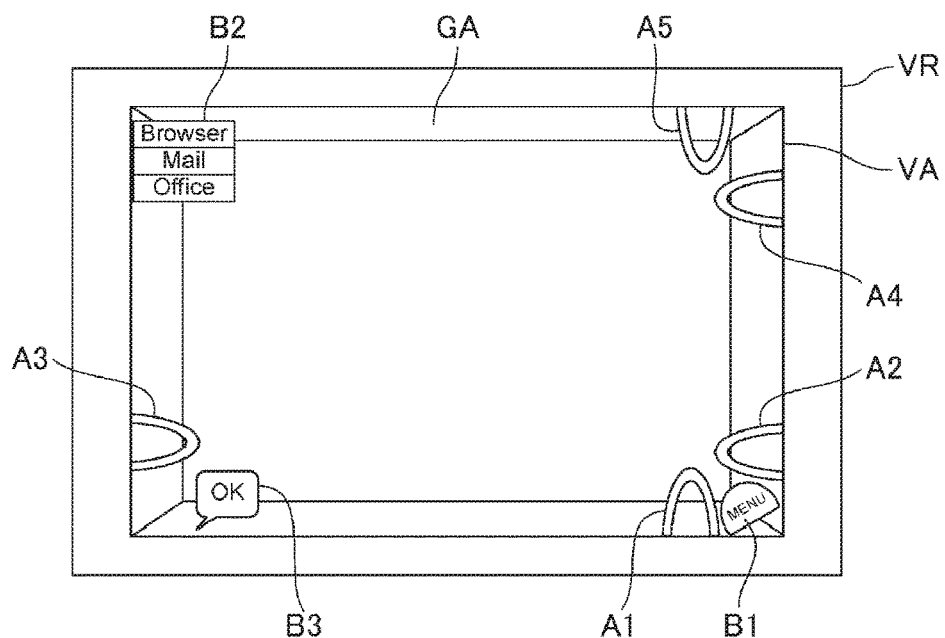
FIGS. 11A and 11B show a specific example of the aspect of operation performed on the HMD and a displayed content corresponding thereto.
Figure 11B:
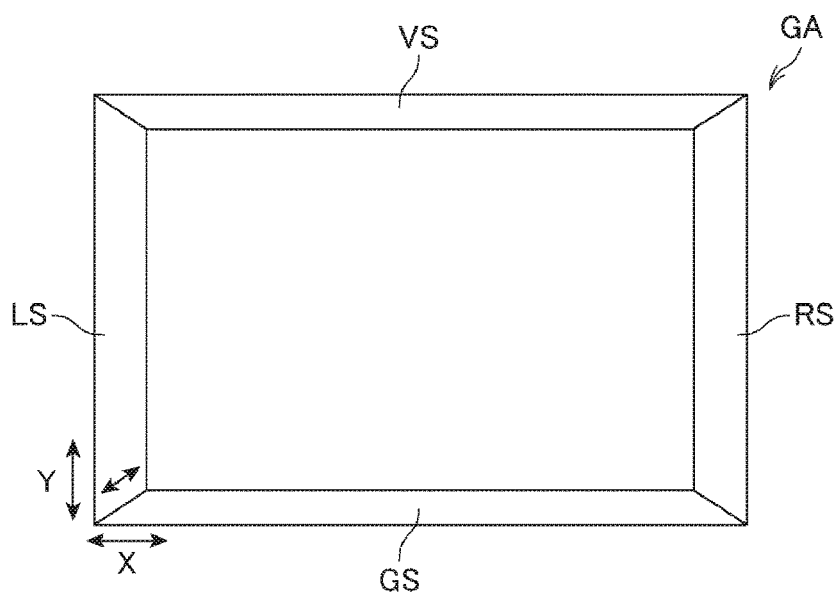

FIGS. 11A and 11B show a specific example of the aspect of operation performed on the HMD 100 and a displayed content corresponding thereto and particularly show an example in which operation in the Z direction is used. FIG. 11A shows the user's field of view VR, and FIG. 11B particularly shows an operation guide region GA displayed in the display region VA. The screen containing the operation guide region GA in FIG. 11A corresponds to an operation screen and a guide screen, and the operation guide region GA particularly corresponds to the guide screen.

In the example shown in FIG. 11A, the operation guide region GA, which displays operation guidance, is placed in the field of view VR. The operation guide region GA is a region where operation icons A1 to A4, a menu button B1, a menu list B2, a displayed guide B3, and other objects are displayed. Each of the operation icons A1 to A4, the menu button B1, the menu list B2, the displayed guide B3, and other objects corresponds to an operation control command image. Further, the operation guide region GA is disposed in the display region VA as a region having a colored region or frame line so that the user can visually recognize the operation guide region GA itself. The menu list B2 corresponds to the menu screen.

FIG. 11B shows the operation guide region GA. The operation guide region GA shown in FIG. 11B is a rectangle having four sides, an upper end section US, a lower end section GS, a right end section RS, and a left end section LS. Each of the upper end section US, the lower end section GS, the right end section RS, and the left end section LS is a trapezoid that allows the operation guide region GA to form an image that provides a depth sensation. The four sides appear to the user to be a rectangular frame extending toward the far (front) side of the visual field (field of view). The operation guide region GA may instead be displayed as a stereoscopic image by causing the right display driver 22 and the left display driver 24 to display images having parallax therebetween under the control of the display control section 190. The operation guide region GA may be displayed as a planar image that has the trapezoidal upper end section US, lower end section GS, right end section RS, and left end section LS and hence provides a depth sensation, as shown in FIG. 11B.

The direction in which the user perceives movement in the depth direction in the operation guide region GA is called a Z direction in FIG. 11B. The horizontal direction in the operation guide region GA is called an X direction, and the vertical direction in the operation guide region GA is called a Y direction.

The operation icons A1 to A4 are displayed in the operation guide region GA, as shown in FIG. 11A. The operation icons A1 to A4 are disposed at the four corners of the operation guide region GA and correspond to operation performed on the four corners of the external sensor 400.

For example, the operation icons A1 and A2, which are displayed at the lower right corner of the operation guide region GA correspond to the lower right corner of the detection range of the external sensor 400. Operation of causing an operation body to come into contact with or bringing an operation body to a position in proximity to the lower right corner of the detection range of the external sensor 400 is detected as operation of selecting the operation icon A1 or A2. The operation icons A1 and A2 move in the X, Y, and Z directions in accordance with the following movement of the operation body. An aspect in which two fingers of one of the user's hands operate the operation icons A1 and A2 is also conceivable.

The operation icon A3 corresponds to the lower left corner of the detection region of the external sensor 400. Operation of causing an operation body to come into contact with or bringing an operation body to a position in proximity to the lower left corner of the detection range of the external sensor 400 is detected as operation of selecting the operation icon A3. The operation icon A3 moves in the X, Y, and Z directions in accordance with the following movement of the operation body.

The operation icons A4 and A5 correspond to the upper right corner of the detection region of the external sensor 400. Operation of causing an operation body to come into contact with or bringing an operation body to a position in proximity to the upper right corner of the detection range of the external sensor 400 is detected as operation of selecting the operation icon A4 or A5. The operation icons A4 and A5 move in the X, Y, and Z directions in accordance with the following movement of the operation body. An aspect in which two fingers of one of the user's hands operate the operation icons A4 and A5 is also conceivable.

The displayed guide B3 is, for example, an icon that allows the user to instruct finalization and corresponds to the lower left corner of the detection region of the external sensor 400. Operation of causing an operation body to come into contact with or bringing an operation body to a position in proximity to the lower left corner of the detection range of the external sensor 400 is detected as operation of selecting the displayed guide B3.

The menu list B2 is a list that is displayed by operation of the menu button B1 and lists setting items and other items. The items displayed in the menu list B2 can be specified by the position input operation described above.

In the present embodiment, the detection range over which the external sensor 400 detects an object is the space that spreads forward, upward, downward, rightward, and leftward with respect to the right light guide 26 and the left light guide 28, as indicated by the symbol D in FIGS. 7A, 7C, and 8A. The operation guide region GA displayed in the display region VA corresponds to the detection range D. Therefore, the right half of the operation guide region GA is related to the right half of the detection range D, and the left half of the operation guide region GA is related to the left half of the detection range D. An object in the right half of the detection range D is in practice detected with the sensor 411, 412, or 413 in the right sensor section 410. Similarly, an object in the left half of the detection range D is in practice detected with the sensor 421, 422, or 423 in the left sensor section 420. That is, the right half of the operation guide region GA is related to a result of the detection performed by the right sensor section 410, and the left half of the operation guide region GA is related to a result of the detection performed by the left sensor section 420.

As described above, the display region VA is recognized as the combination of images visually recognized through the right light guide 26 and the left light guide 28 with the user's two eyes by the user's visual function. Therefore, in the right light guide 26, the left half of the operation guide region GA is located in the left half of the image displayed through the right light guide 26 but related to the left sensor section 420. Similarly, in the left light guide 28, the right half of the operation guide region GA is located in the right half of the image displayed through the left light guide 28 but related to the right sensor section 410. As described above, the operation guide region GA is so positionally related to the entire external sensor 400 as to correspond to the detection range D at which the user consciously looks. The user therefore consciously looks at the entire frame 3 as a range that an operation body is brought to a position in proximity to or caused to come into contact with, and the user can intuitively operate the operation icons A1 to A5, the menu button B1, the displayed guide B3, and other objects displayed in the operation guide region GA.

During the display shown in FIG. 11A, the HMD 100 can activate the normal action mode to allow the user to perform operation on the operation icons A1 to A5, the menu button B1, the menu list B2, and the displayed guide B3. During the display of the operation guide region GA, the user can perform position specifying operation in the display region VA by operating the touchpad 401 or 402 to select any of the operation icons A1 to A5, the menu button B1, the menu list B2, and the displayed guide B3. After the selection operation, the user can perform tapping operation or pressing operation on the touchpad 401 or 402 to finalize the selection.

In the embodiment described above, the size or the area of the detection range of the external sensor 400 in the proximity operation mode may be changed in accordance with an image displayed by the process execution section 164, that is, the aspect of the user interface. The size of the detection range of the sensor may be switched, for example, from one of three states, contact, proximity, and semi-proximity, to another. For example, in the display states shown in FIGS. 7B and 7D, the detection range may have the semi-proximity size. In the display states shown in FIGS. 8B and 8C, the detection range may have the contact size. In the display states shown in FIGS. 9A and 9B to 11A and 11B, the detection range may have the proximity size. For example, in the case where the detection range is set to have the contact size, the input detection section 162 may detect contact with each of the sensors. In the case where the detection range is set to have the proximity size, the detection range is set to be 2 cm or shorter from the surface of each of the sensors. In the case where the detection range is set to have the semi-proximity size, the detection range is set to be 5 cm or shorter from the surface of each of the sensors. Instead, in a state in which the detection range is set to have the proximity and semi-proximity sizes, the input detection section 162 may distinguish operation of causing an operation body to come into contact with the surface of any of the sensors and operation of causing the operation body to come into contact with the surface of none of the sensors from each other.

As described above, the HMD 100 according to the first embodiment to which the invention is applied includes the right light guide 26 and the left light guide 28 or the image display section 20, which serves as a display section that displays an image in such a way that the user can visually recognize the real space in the state in which the HMD 100 is mounted on the user's head. The HMD 100 further includes the external sensor 400, which detects approach of an operation body to regions close to the right light guide 26 and the left light guide 28, and the touchpads 401 and 402, which accept operation. On the basis of motion of the operation body detected with the external sensor 400, the control section 140 causes displayed contents displayed by the right light guide 26 and the left light guide 28 to correspond to operation corresponding to the motion of the operation body.

According to the configuration of the HMD 100 and the method for controlling the HMD 100, the user can readily operate the HMD 100 without touching the frame 3, whereby the convenience of the HMD 100 can be improved, for example, in a case where the user performs operation during work.

Further, the control section 140 switches the normal action mode, in which a process is executed in correspondence with operation accepted by the touchpad 401 or 402, to the proximity operation mode, in which a process accompanied by display operation performed by the image display section 20 is executed in correspondence with a result of the detection performed by the external sensor 400, and vice versa and activates the switched mode. Switching the action mode of the HMD 100 between the proximity operation mode, in which proximity operation is performed, and the normal action mode therefore prevents wrong operation.

The control section 140 may cause the image display section 20 to display, for example, a screen containing the menu list B2 as the menu screen for operation. In this case, in the normal action mode, the control section 140 can process operation accepted by the touchpad 401 or 402 as operation of selection or finalization of an item in the menu list B2. In the proximity operation mode, the control section 140 can perform selection or finalization in the operation guide region GA containing the menu list B2 in correspondence with approach or separation of an object detected with the external sensor 400. The HMD 100 can therefore be readily operated by using the menu screen in each of the normal action mode and the proximity operation mode.

The image display section 20 includes the left light guide 28, which serves as a display section for the left eye located on the user's left eye side in the state in which the HMD 100 is mounted on the user's head, and the right light guide 26, which serves as a display section for the right eye located on the user's right eye side. The control section 140 sets a process to be executed by the control section 140 in relation to the combination of operation performed on the display section for the left eye and detected with the external sensor 400 and operation performed on the display section for the right eye and detected with the external sensor 400. As a result, since a process according to the combination of operation performed on the right side of the HMD 100 and operation performed on the left side of the HMD 100 is executed, possibility of wrong operation decreases, whereby an advanced, complicated process can be assigned to proximity operation. The HMD 100 can therefore be more readily operated.

The control section 140 may cause the image display section 20 to display the operation guide region GA, which serves as the guide screen containing information on operation detected with the external sensor 400, as shown in FIG. 11A. In this case, information displayed in the left half of the operation guide region GA is related to operation performed on the left portion of the display section for the left eye, and information displayed in the right half of the operation guide region GA is related to operation performed on the right portion of the display section for the right eye. The user can therefore use the shape of the image display section 20 mounted on the user's head to intuitively perform operation while viewing the guide screen.

The control section 140 causes the image display section 20 to display the screen for operation in an aspect in which the screen is visually recognized with both the user's right and left eyes. The control section 140 then changes a displayed content in the left half of the screen for operation in correspondence with operation performed on the left portion of the display section for the left eye, as shown in FIG. 11A. Similarly, the control section 140 changes a displayed content in the right half of the screen for operation in correspondence with operation performed on the right portion of the display section for the right eye. The user can therefore use the shape of the image display section 20 mounted on the user's head to change the displayed contents in an aspect suitable for the user's feeling.

Further, the external sensor 400 detects approach of an object to the display section for the left eye and approach of an object to the display section for the right eye, whereby the user can operate the HMD 100 without touching the frame 3.

The control section 140 can change a displayed content in correspondence with operation of moving an object detected with the external sensor 400 in the upward/downward direction with respect to the user's head, that is, in the Y direction and in the rightward/leftward direction with respect to the user's head, that is, in the X direction. Further, the control section 140 changes a content displayed by the image display section 20 in correspondence with operation of causing an object to approach or move away from the image display section 20, that is, operation in the Z direction detected with the external sensor 400. As a result, since operation of causing an object to approach or move away from the image display section 20 and operation of moving the object in the upward/downward direction or the rightward/leftward direction are detected, a variety of operations can be more readily performed on the HMD 100.

In the case where the external sensor 400 detects operation of moving an object in the X and Y directions along both the display section for the right eye and the display section for the left eye, the control section 140 accepts input of a position in the upward/downward direction or the rightward/leftward direction in the display region of the image display section 20, as shown in FIGS. 7A to 7D. A position can therefore be inputted by operation of moving an object in such a way that the object approaches the image display section 20, whereby the HMD 100 can be more readily operated.

The position where images displayed by the right light guide 26 and the left light guide 28 are displayed under the control of the control section 140 does not necessarily coincide with the operation position where the external sensor 400 detects operation, as shown in FIGS. 7A to 7D. In the example shown in FIGS. 7A to 7D, the X-direction guide GX and the Y-direction guide GY move in correspondence with the direction in which the operation bodies RH and LH move. In this example, the positions where the guides are displayed may differ from the positions where the operation bodies RH and LH are detected. In other words, the control section 140 accepts input corresponding to positions different from the detected operation positions in correspondence with operation performed in at least two positions and detected with the external sensor 400. As a result, in position input, restriction on correspondence between an inputted position and an operation position is eased, whereby the display apparatus can be more readily operated.

The positions where the guides are displayed do not necessarily correspond to or coincide with the positions where the operation bodies are detected and may be positions of the guides that are present when the operation bodies RH and LH are detected or positions readily visually recognized by the user. In this case, operability achieved by an input device that inputs a relative position, such as a mouse, can be achieved.

The external sensor 400 may be configured to detect contact with the outer surface of the image display section 20 and approach of an object to the image display section 20 from a region outside the image display section 20.

Further, in a case where the external sensor 400 detects rotation operation, the control section 140 may rotate a content displayed in the display region of the image display section 20.

In a case where the external sensor 400 detects operation performed on two points and the distance between detected operation positions at the two points changes, the control section 140 may enlarge or reduce a content displayed in the display region of the image display section 20 in correspondence with the change in the distance.

Further, the HMD 100 according to the first embodiment to which the invention is applied includes the right light guide 26 and the left light guide 28 or the image display section 20, which serves as the display section that displays an image in such a way that the user can visually recognize the real space in the state in which the HMD 100 is mounted on the user's head. The HMD 100 further includes the external sensor 400, which detects approach of an operation body to regions close to the right light guide 26 and the left light guide 28. In a case where the external sensor 400 detects at least two types of operation performed in regions close to the right light guide 26 and the left light guide 28, the control section 140 executes a process set in relation to the at least two types of operation.

According to the configuration of the HMD 100 and the method for controlling the HMD 100, the user can readily operate the HMD 100 without touching the frame 3, whereby the convenience of the HMD 100 can be improved, for example, in a case where the user performs operation during work. Further, since a process to be executed is related to at least two types of operation performed on the frame 3, wrong operation can be avoided.

The image display section 20 includes the left light guide 28, which serves as the display section for the left eye located on the user's left eye side in the state in which the HMD 100 is mounted on the user's head, and the right light guide 26, which serves as the display section for the right eye located on the user's right eye side. A process executed by the control section 140 is set in relation to the combination of operation performed on the left light guide 28 and detected with the external sensor 400 and operation performed on the right light guide 26 and detected with the external sensor 400. As a result, since a process according to the combination of operation performed on the right side of the HMD 100 and operation performed on the left side of the HMD 100 is executed, possibility of wrong operation decreases, whereby an advanced, complicated process can be assigned to proximity operation. The HMD 100 can therefore be more readily operated.

Since the external sensor 400 detects operation of causing an object to approach the left light guide 28 and come into contact therewith and operation of causing an object to approach the right light guide 26 and come into contact therewith, the user can operate the HMD 100 in a variety of aspects, and wrong operation can be avoided.

In a case where the external sensor 400 detects operation of moving an object in the Z and Y directions along both the right light guide 26 and the left light guide 28, the control section 140 accepts an input of a position in the upward/downward direction or the rightward/leftward direction in the display region of the image display section 20, as shown in FIGS. 7A to 7D. A position can therefore be inputted by operation of moving an object in such a way that the object approaches the image display section 20, whereby the HMD 100 can be more readily operated.

Further, the position where images displayed by the right light guide 26 and the left light guide 28 are displayed under the control of the control section 140 does not necessarily coincide with the operation position where the external sensor 400 detects operation, as shown in FIGS. 7A to 7D. In the example shown in FIGS. 7A to 7D, the X-direction guide GX and the Y-direction guide GY move in correspondence with the directions in which the operation bodies RH and LH move. In this example, the positions where the guides are displayed may differ from the positions where the operation bodies RH and LH are detected. In other words, the control section 140 accepts input corresponding to positions different from the detected operation positions in correspondence with operation performed in at least two positions and detected with the external sensor 400.

The positions where the guides are displayed do not necessarily correspond to or coincide with the positions where the operation bodies are detected and may be positions of the guides that are present when the operation bodies RH and LH are detected or positions readily visually recognized by the user. In this case, operability achieved by an input device that inputs a relative position, such as a mouse, can be achieved.

Since the external sensor 400 detects approach of an object to the left light guide 28 (display section for left eye) and approach of an object to the right light guide 26 (display section for right eye), the user can operate the HMD 100 without touching the frame 3.

The external sensor 400 may be configured to detect contact with the outer surfaces of the right light guide 26 and the left light guide 28 and approach of an object to the right light guide 26 and the left light guide 28 from a region outside the right light guide 26 and the left light guide 28.

In a case where the external sensor 400 detects rotation operation, the control section 140 may rotate a content displayed in the display region of the image display section 20.

In a case where the external sensor 400 detects operation performed on two points and the distance between detected operation positions at the two points changes, the control section 140 may enlarge or reduce a content displayed in the display region of the image display section 20 in correspondence with the change in the distance.

In a case where the external sensor 400 detects operation of causing an object to be in contact with the surface of the right light guide 26 or the left light guide 28 at least for a predetermined period or operation of causing an object to cover at least a predetermined area of the right light guide 26 or the left light guide 28, the control section 140 causes the camera 61 to perform imaging. The imaging can therefore be readily performed by operation performed on the frame 3, whereby wrong operation can be avoided.

The external sensor 400 may be configured to detect approach of an instruction body to the holder of the right light guide 26 or the left light guide 28, which is an optical part that forms the display section. As a result, approach of the operation body to regions close to the right light guide 26 and the left light guide 28 can be more reliably detected and reflected on a displayed content.

The HMD 100 includes the external sensor 400, which detects approach of an operation body to regions close to the right light guide 26 and the left light guide 28, and the touchpads 401 and 402, which accept operation. The control section 140 switches the normal action mode, in which a process is executed in correspondence with operation accepted by the touchpad 401 or 402, to the proximity operation mode, in which a process accompanied by display operation performed by the image display section 20 is executed in correspondence with a result of the detection performed by the external sensor 400, and vice versa and activates the switched mode. The convenience of the HMD 100 can therefore be improved, for example, in a case where the user performs operation during work. Switching the action mode of the HMD 100 between the proximity operation mode, in which proximity operation is performed, and the normal action mode prevents wrong operation.

The control section 140 may cause the image display section 20 to display, for example, a screen containing the menu list B2 as the menu screen for operation. In this case, in the normal action mode, the control section 140 can process operation accepted by the touchpad 401 or 402 as operation of selection or finalization of an item in the menu list B2. In the proximity operation mode, the control section 140 can perform selection or finalization in the operation guide region GA containing the menu list B2 in correspondence with approach or separation of an object detected with the external sensor 400. The HMD 100 can therefore be readily operated by using the menu screen in each of the normal action mode and the proximity operation mode.

The control section 140 may cause the right light guide 26 and the left light guide 28 to display the operation guide region GA, which serves as the guide screen containing information on operation detected with the external sensor 400, as shown in FIG. 11A. In this case, information displayed in the left half of the operation guide region GA is related to operation performed on the left portion of the display section for the left eye, and information displayed in the right half of the operation guide region GA is related to operation performed on the right portion of the display section for the right eye. The user can therefore use the shape of the frame 3 mounted on the user's head to intuitively perform operation while viewing the guide screen.

The control section 140 causes the right light guide 26 and the left light guide 28 to display the screen for operation in an aspect in which the screen is visually recognized with both the user's right and left eyes. The control section 140 then changes a displayed content in the left half of the screen for operation in correspondence with operation performed on the left portion of the display section for the left eye, as shown in FIG. 11A. Similarly, the control section 140 changes a displayed content in the right half of the screen for operation in correspondence with operation performed on the right portion of the display section for the right eye. The user can therefore use the shape of the image display section 20 mounted on the user's head to change a displayed content in an aspect suitable for the user's feeling.

The control section 140 can change a displayed content in correspondence with operation of moving an object detected with the external sensor 400 in the upward/downward direction with respect to the user's head, that is, in the Y direction and in the rightward/leftward direction with respect to the user's head, that is, in the X direction. The control section 140 changes a content displayed by the image display section 20 in correspondence with operation of causing an object to approach or move away from the image display section 20, that is, operation in the Z direction detected with the external sensor 400. As a result, since operation of causing an object to approach or move away from the image display section 20 and operation of moving the object in the upward/downward direction or the rightward/leftward direction are detected, a variety of types of operation can be more readily performed on the HMD 100.

The external sensor 400 includes the sensors 411, 412, 413, 421, 422, and 423, which are proximity sensors disposed around the circumferences of (in regions close to) the right light guide 26 and the left light guide 28. The control section 140 causes a display content to correspond to operation control on the basis of motion of an operation body detected with the proximity sensors described above. As a result, the proximity sensors disposed around the circumferences of (in regions close to) the right light guide 26 and the left light guide 28 can more reliably detect approach of the operation body to the circumferences of (regions close to) the right light guide 26 and the left light guide 28, and the operation of moving the operation body can be reflected on a displayed content.

In a case where the proximity sensors described above detect approach of an operation body to the regions close to the right light guide 26 and the left light guide 28, the control section 140 causes the right light guide 26 and the left light guide 28 to display an operation control command image, as shown, for example, in FIG. 11A. The control section 140 may relate operation performed on the touchpad 401 or 402 to the operation control command image. In this case, operation can be performed by using motion of the operation body detected with the proximity sensors disposed around the circumferences of (in regions close to) the right light guide 26 and the left light guide 28 and using the operation control command image, which functions, for example, as a GUI, whereby operability can be improved.

In a case where the proximity sensors detect approach to two positions, the control section 140 may display the Y-direction guide GY or the X-direction guide GX, which serves as an operation control command image and is shown, for example, in FIGS. 7A to 7D. That is, in a case where operation of two operation bodies, such as two fingers, is detected, the Y-direction guide GY or the X-direction guide GX is displayed as an operation control command image corresponding to the two operation bodies. Motion of the Y-direction guide GY or the X-direction guide GX in a predetermined direction may then be related to motion of the operation bodies in a predetermined direction detected in the state in which the operation control command image corresponding to the two positions is displayed. In this case, operation of causing the operation bodies to approach the proximity sensors in the two positions allows the operation control command image to move in the direction corresponding to the motion of the operation bodies. Further, the operation can be performed as action different from action in a case where one operation body, such as a hand or one finger, is caused to approach the proximity sensors by switching the action to the operation. The two operation bodies therefore readily allow operation of position instruction, direction instruction, and other instructions.

The control section 140 may cause the right light guide 26 and the left light guide 28 to display a displayed content that shows the arrangement of the proximity sensors relative to the right light guide 26 and the left light guide 28. For example, the control section 140 may cause the right light guide 26 and the left light guide 28 to display an image showing the positions, the number, the detection ranges, and other factors of the sensors 411, 412, 413, 421, 422, and 423 disposed around the circumferences of (in regions close to) the right light guide 26 and the left light guide 28 in the form of a figure. In this case, operation of causing an operation body to approach to the proximity sensors can be more reliably performed.

The right light guide 26 and the left light guide 28 are configured to transmit the outside light OL for visual recognition of a real object and display images in such a way that the images are superimposed on the real object for visual recognition. As a result, the user on whom the right light guide 26 and the left light guide 28, which transmit the outside light OL for visual recognition of a real object and allow the user to visually recognize images, are mounted visually recognizes the real object superimposed on the images. The user can then perform operation of causing an operation body to approach the right light guide 26 and the left light guide 28 on the basis of the visually recognized images. As a result, a displayed content associated with the real object can be readily controlled by simple operation of causing the operation body to approach the right light guide 26 and the left light guide 28.

In the embodiment described above, the displayed operation control command image, such as the Y-direction guide GY and the X-direction guide GX, which are displayed by the right light guide 26 and the left light guide 28, may be changed in accordance with the external environment. For example, the camera 61 may be used to detect the brightness in the surroundings of the HMD 100 (luminance or illuminance of outside light), and the luminance or color arrangement of images displayed by the right light guide 26 and the left light guide 28 may be automatically adjusted in accordance with the detected brightness. Further, to suppress the electric power consumed by the HMD 100, an energy saving mode or any other mode may be activated so that only one of the right light guide 26 and the left light guide 28 displays an operation control command image. In this case, the input analysis section 163 may detect approach of an operation body by using the right sensor section 410 or the left sensor section 420, that is, only the sensor section on the side where display operation is performed. Further, a marker for identifying a target object in the real space that is a target on which an AR image is superimposed may be used, and the marker may be controlled by the proximity sensors. Instead, a sight line sensor that detects the user's line of sight may be provided, and a result of the detection performed by the sight line sensor may also be used to identify a target object.

The processing section 10 may be configured to be capable of displaying a GUI that matches the configuration of the external sensor 400 in the frame 3, and an application program may provide the GUI. In this case, the camera 61 captures a mirror image of the user on whom the HMD 100 is mounted or an image of a marker or any other object corresponding to the HMD 100, and the control section 140 identifies the model number or any other attribute of the HMD 100 on the basis of data on the captured image. The control section 140 only needs to acquire data on a GUI that matches the identified model number of the HMD 100 (operation control command image described above, for example) and display the GUI. Data on the GUI in this case and data for identifying the model number or any other attribute of the HMD 100 may be stored by the HMD 100 in the storage section 120 in advance or may be acquired from an external apparatus through communication via the communication section 117 or any other component.

The control section 140 may execute a process corresponding to operation of an operation body detected with the external sensor 400 and an operation control command image. In this case, a GUI that shows the content of the operation may be displayed or otherwise provided.

Second Embodiment

Figure 12:
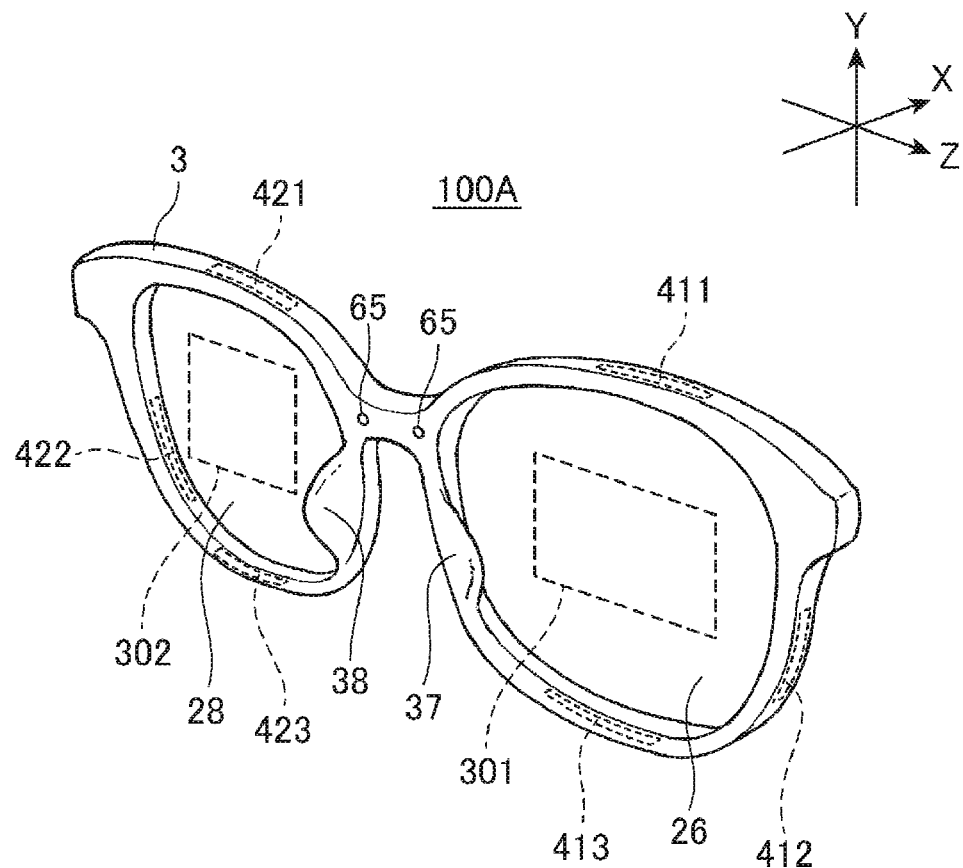
FIG. 12 shows an exterior appearance of an HMD according to a second embodiment.

FIG. 12 is an exterior appearance view showing the configuration of an HMD 100A according to a second embodiment to which the invention is applied.

The HMD 100A shown in FIG. 12 is similar to the HMD 100 according to the first embodiment described above but includes sight line sensors 65 provided in positions facing the user's eyes. The sight line sensors 65 are so provided as a pair in positions between the right light guide 26 and the left light guide 28 as to correspond to the user's right and left eyes. The sight line sensors 65 are formed, for example, of a pair of cameras that capture images of the user's right and left eyes. The sight line sensors 65 perform imaging under the control of the control section 140, and the control section 140 detects light reflected off the eyeball surfaces of the right eye RE and the left eye LE and images of the pupils from data on the captured images to identify the direction of the line of sight.

Therefore, for example, in the position input operation in the normal action mode, the control section 140 may identify the direction of the user's line of sight and detect a position in the direction of the line of sight as an input. Further, in the proximity operation mode, the control section 140 may accept finalization operation on the basis of a result of the detection performed by the sight line sensors 65. For example, in a case where a menu item in the menu list B2 is selected in accordance with the position or motion of an object detected with the external sensor 400, the sight line sensors 65 may detect the user's blink and detect the blink as operation of finalizing the selection.

The HMD 100A can perform the other types of action in the same manner the HMD 100 can.

Third Embodiment

Figure 13:
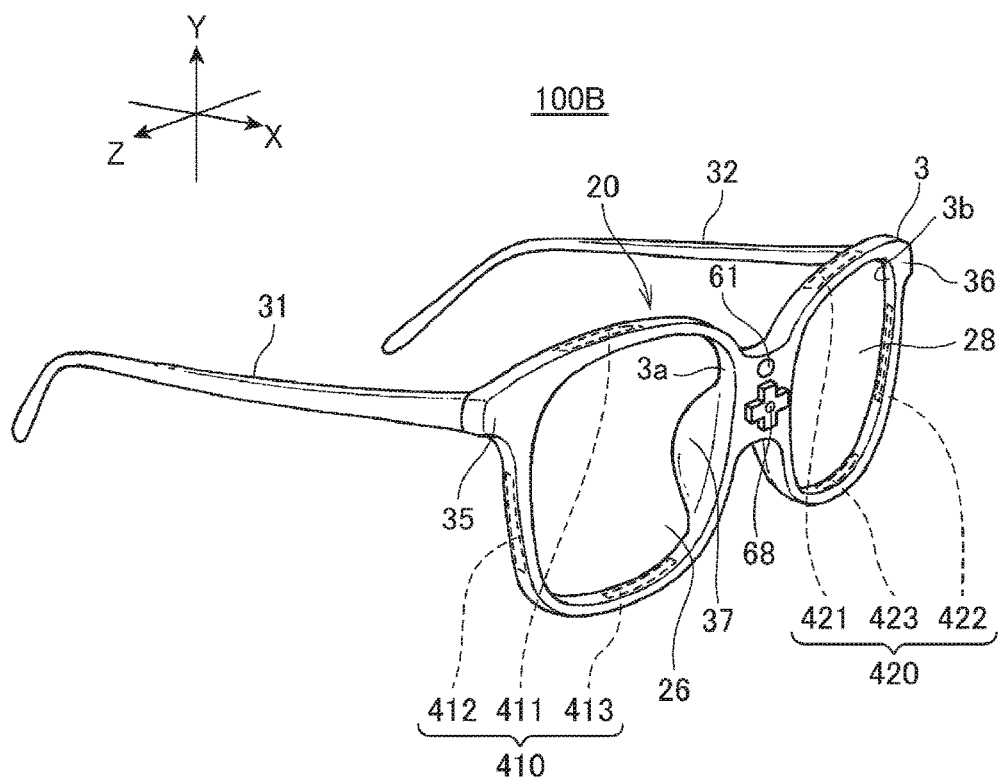
FIG. 13 shows an exterior appearance of an HMD according to a third embodiment.

FIG. 13 is an exterior appearance view showing the configuration of an HMD 100B according to a third embodiment to which the invention is applied.

The HMD 100B shown in FIG. 13 is similar to the HMD 100 according to the first embodiment described above but does not include the touchpad 401 or 402. The HMD 100B includes a direction key 67 and a finalization key 68 below the camera 61.

In the HMD 100B, operation of the direction key 67 allows instruction of a direction out of the four directions, the upward, downward, rightward, and leftward directions, and the direction instruction can be used to perform position input. The direction key 67 can be used in the normal action mode as the touchpads 401 and 402 can.

The finalization key 68, which is located at the center of the direction key 67, functions as a key that instructs finalization when pressed down.

The control section 140 changes the display aspect in the normal action mode in accordance with operation of the direction key 67 and the finalization key 68.

The HMD 100B can perform the other types of action in the same manner the HMD 100 can.

Fourth Embodiment

Figure 14:
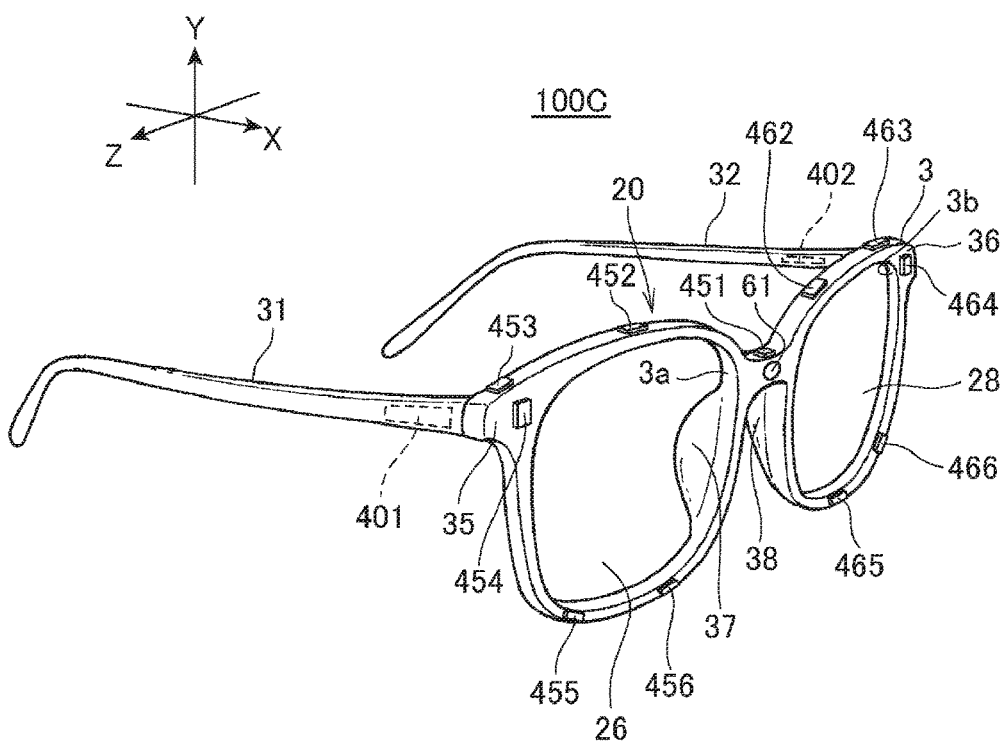
FIG. 14 shows an exterior appearance of an HMD according to a fourth embodiment.

FIG. 14 is an exterior appearance view showing the configuration of an HMD 100C according to a fourth embodiment to which the invention is applied.

The HMD 100C shown in FIG. 14 includes sensors 451 to 456 and 462 to 466 in place of the sensors 411, 412, 413, 421, 422, and 423 provided in the HMD 100 according to the first embodiment described above.

The sensor 451 is located above the camera 61 and disposed on the upper end surface of the frame 3 or an upper portion of the front surface of the frame 3. The sensors 452, 453, 454, 455, and 456 are disposed around the circumference of the right light guide 26. The sensors 462, 463, 464, 465, and 466 are disposed around the circumference of the left light guide 28.

The sensors 451 to 456 and 462 to 466 can be used as sensors that form the external sensor 400. The sensors 451 to 456 and 462 to 466 can detect approach and contact of an object as the sensors 411 to 413 and 421 to 423 can, and can each be formed, for example, of a capacitance-type proximity sensor.

Each of the sensors 451 to 456 and 462 to 466 is preferably so disposed as not to block the outside light OL that passes through the right light guide 26 and the left light guide 28. The sensors 451 to 456 and 462 to 466 are separated from each other by an arbitrary distance and arranged in an arbitrary manner, and the separation and the arrangement can be set as appropriate in accordance with the characteristics of the sensors. It is preferable that the same detection range D as that in the first embodiment is consequently achieved.

The detection range D in the case where the external sensor 400 is formed of the sensors 451 to 456 and 462 to 466 can be roughly the same as that in the example described in the first embodiment described above. Further, the function and action of the HMD 100C can be the same as those of the HMD 100.

As described above, the number of proximity sensors and the arrangement thereof in the HMD are arbitrary, and a larger number of sensors may be used. Further, in the HMDs 100, 100A, 100B, and 100C, the sensors that detect approach of an object and the sensors that detect contact of an object may be disposed as different sensors.

In any of these cases, the operation performed by the user using the operation body can be detected properly by appropriately analyzing the detection values from the sensor by the input analysis section 163.

Fifth Embodiment

Figure 15:
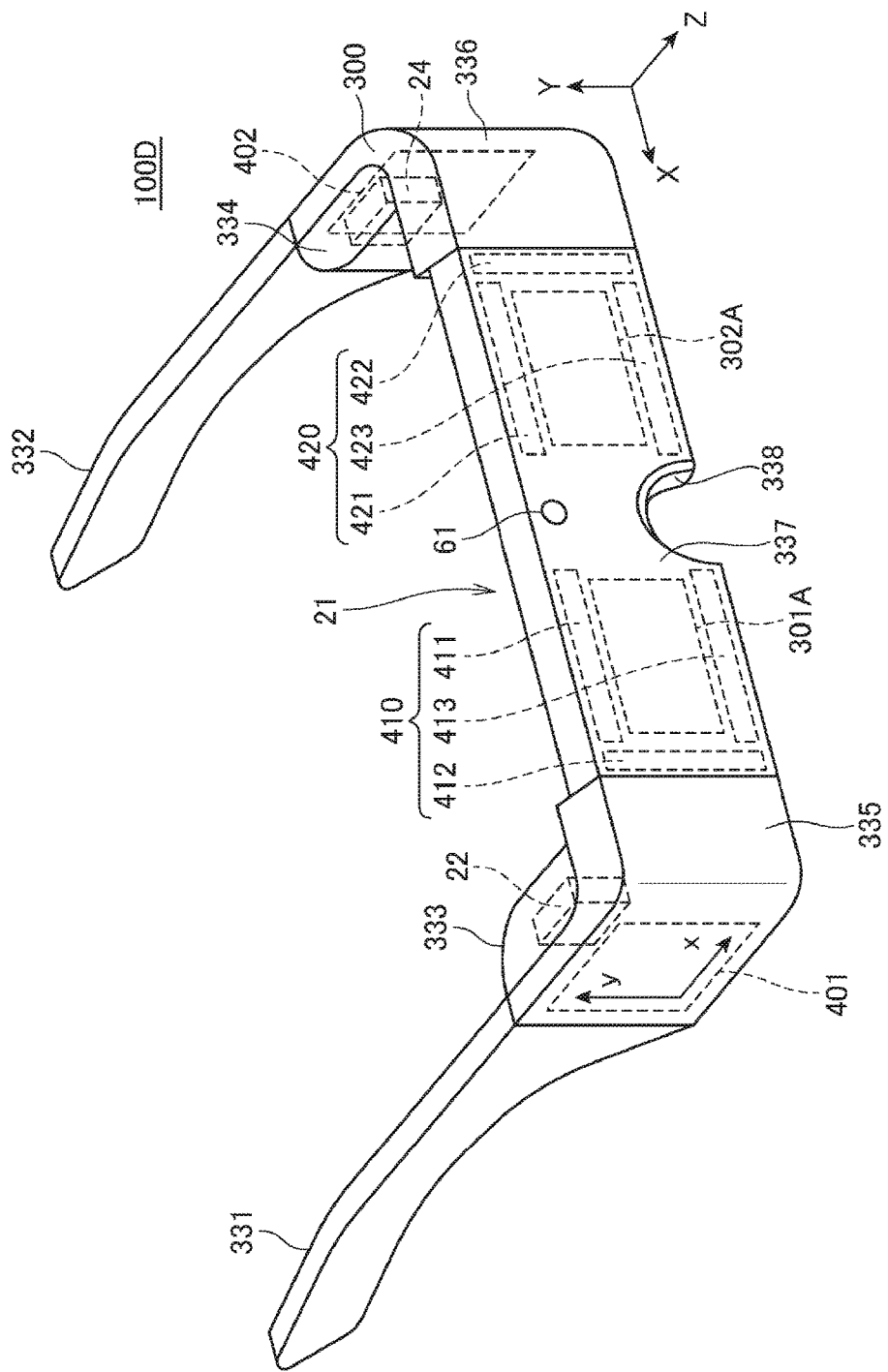
FIG. 15 shows an exterior appearance of an HMD according to a fifth embodiment.

FIG. 15 is an exterior appearance view showing the configuration of an HMD 100D according to a fifth embodiment to which the invention is applied.

The HMD 100D is another aspect of the display apparatus that allows the user to visually recognize a virtual image in the state in which the display apparatus is mounted on the user's head and has a glasses-like shape. FIG. 15 is a perspective view of the HMD 100D viewed from the front.

A frame 300, which forms a main body of the HMD 100D, includes a transmissive display section 337, which is located in front of the user's face, a right accommodation section 335 and a left accommodation section 336, which support the sides of the transmissive display section 337, and a right holder 331 and a left holder 332, which come into contact with the user's temporal regions.

The transmissive display section 337 has a plate-like shape as a whole, and a nose pad 338, which is a recess that is allowed to come into contact with the user's nose, is formed at the center of the lower end of the transmissive display section 337. The transmissive display section 337 is located in front of the eyes of the user on whom the HMD 100D is mounted and allows the user's eyes to visually recognize an image.

The right accommodation section 335 is fixed to a side end portion of the transmissive display section 337 and supports the right holder 331. A case 333 is attached to the inner side of the right accommodation section 335. The left accommodation section 336 is fixed to a side end portion of the transmissive display section 337 and supports the left holder 332. A case 334 is attached to the inner side of the left accommodation section 336. The frame 300 of the HMD 100D according to the present embodiment has a structure in which the right holder 331, the right accommodation section 335, the transmissive display section 337, the left accommodation section 336, and the left holder 332 are fixed to each other. The directions called the right and left directions in the configuration of the HMD 100D correspond to the right and left of the user on whom the HMD 100D is mounted. The same holds true for the way the names of the right-eye side and the left-eye side are used.

The right holder 331 and the left holder 332 serve as the temples of glasses and hold the frame 300 on the user's head. The frame 300 includes a right transmissive section 301A and a left transmissive section 302A, which are located in front of the user's eyes and allow the user to visually recognize images. The right transmissive section 301A is located in front of the user's right eye, and the left transmissive section 302A is located in front of the user's left eye. The center position of the transmissive display section 337 where the nose pad 338 is provided is located in front of the middle of the user's forehead, and the camera 61 is provided in the position.

The right transmissive section 301A, which corresponds to the right display section 301, transmits the outside light OL to allow the user's right eye to visually recognize an outside scene and guides the image light L to the user's right eye to allow it to visually recognize an image. The left transmissive section 302A, which corresponds to the left display section 302, transmits the outside light OL to allow the user's left eye to visually recognize the outside scene and guides the image light L to the user's left eye to allow it to visually recognize an image.

The configurations of the camera 61, the external sensor 400, and the touchpads 401 and 402 are the same as those in the first embodiment described above except the detailed shapes and other factors.

The frame 300 includes an image display section 21, which includes the right display driver 22 and the left display driver 24 and further includes the camera 61, the nine-axis sensor 66, the external sensor 400, and the touchpads 401 and 402, as the image display section 20 provided in the frame 3 (FIG. 1) does.

The case 333, for example, accommodates the right display driver 22, and the case 334, for example, accommodates the left display driver 24.

The other portions that form the image display section 21 may be disposed, for example, in the right accommodation section 335 and the left accommodation section 336 of the frame 300.

Further, the portions that form the processing section 10 (FIG. 5) are disposed in the frame 300.

The right sensor section 410 and the left sensor section 420 are disposed on the front side of the transmissive display section 337. The sensors 411, 412, and 413, which form the right sensor section 410, are disposed around the circumference of the right transmissive section 301A. In detail, the sensor 411 is disposed above the right transmissive section 301A. The sensor 412 is disposed in a position shifted from the right transmissive section 301A toward the right holder 331. The sensor 413 is disposed below the right transmissive section 301A.

The sensor 421, which forms the left sensor section 420 is disposed above the left transmissive section 302A. The sensor 422 is disposed in a position shifted from the left transmissive section 302A toward the left holder 332. The sensor 423 is disposed below the left transmissive section 302A.

The right sensor section 410 forms a detection section that is located in the transmissive display section 337 and corresponds to a portion located on the side facing the user's right eye, and the left sensor section 420 forms a detection section that is located in the transmissive display section 337 and corresponds to a portion located on the side facing the user's left eye.

In this configuration, the sensors that form the right sensor section 410 and the left sensor section 420 are disposed in the transmissive display section 337, which includes the right transmissive section 301A and the left transmissive section 302A and is configured as a unitary section in appearance. The configuration allows efficient detection of operation of causing an operation body to approach the frame 300 toward the front side thereof and other types of operation.

The invention is not limited to the configuration of each of the embodiments described above and can be implemented in a variety of other aspects to the extent that they do not depart from the substance of the invention.

In each of the embodiments described above, the configuration in which the user visually recognizes an outside scene through the display section is not limited to the configuration in which the right light guide 26 and the left light guide 28 transmit outside light. For example, the invention is also applicable to a display apparatus that displays an image but does not allow a user to visually recognize an outside scene. Specifically, the invention is applicable to a display apparatus that displays an image captured with the camera 61, an image and a CG produced on the basis of the captured image, video images based on prestored video data or externally inputted video data, and other types of image. An example of a display apparatus of this type may include a display apparatus that does not allow a user to visually recognize an outside scene or what is called a closed-type display apparatus. Further, a display apparatus that does not perform AR display, MR display, or VR display but displays an externally inputted video data set or analog video signal is, of course, an apparatus to which the invention is applied.

Further, in the embodiments described above, the configuration in which the proximity sensors that form the external sensor 400 detect approach of an operation body is presented, but the invention is not limited thereto. For example, cameras (not shown) that capture images of outside scenes from inner positions, such as the rims 3a and 3b, may be provided in the frame 3, and approach of an operation body may be detected on the basis of the images captured with the camera.

Further, for example, the frame 3 may be replaced with an image display section mounted, for example, as a cap or any other image display section mounted based on another method. That is, a display section that displays an image in correspondence with a user's left eye and a display section that displays an image in correspondence with the user's right eye only need to be provided. Moreover, the display apparatus according to each of the embodiments of the invention may, for example, be configured as a head mounted display incorporated in an automobile, an airplane, and other vehicles. Further, for example, the display apparatus may be configured as a head mounted display built in a helmet or other body protection gears. In this case, a positioning portion that determines the position of the display apparatus relative to a user's body and a portion that is positioned relative to the positioning portion can be a portion mounted on the user.

Further, the embodiments described above have been described with reference to the configuration in which the image display section 20 or 21 and the processing section 10 are accommodated in the frame 3 or 300. Instead, the processing section 10 may be separated from the frames 3 and 300, and the processing section and the frame may be connected to each other via a connection cable. In this case, the processing section 10 may be a notebook computer, a tablet computer, or a desktop computer. Still instead, the processing section 10 may, for example, be a portable electronic apparatus including a game console, a mobile phone, a smartphone, and a portable media player, or any other dedicated apparatus. Further, the processing section 10 may be configured to be separate from the frame 3 or 300, and a variety of signals may be transmitted and received between the processing section 10 and the image display section 20 or 21 over wireless communication.

Further, for example, the configuration that generates image light in each of the image display sections 20 and 21 may include an organic EL (organic electro-luminescence) display and an organic EL control section. Moreover, an LCOS (liquid crystal on silicon) device (LCoS is a registered trademark), a digital micromirror device, or any other device can be used as the configuration that generates image light.

The "display section" used in the invention corresponds to a configuration that outputs image light, and the HMDs 100 to 100D's operation of outputting image light has been called "displaying". For example, the embodiments described above illustrate the configuration in which the right and left image light generation units generate image light and the right light guide 26 and the left light guide 28 direct the image light toward the user's right and left eyes to cause the image light to be incident on the user's right and left eyes. The configuration of the "display section" is not limited to the configuration described above. That is, any configuration that directs the image light may be employed. For example, in the configuration of each of the embodiments, the "right light guide" and the "left light guide" having the half-silvered mirrors 261A and 262A output the image light toward the user's eyes. As the configuration that generates image light, the right backlight 221 and the left backlight 222 as well as the right LCD 241 and the left LCD 242 are further provided. The "display section" does not require these components as essential portions.

For example, image light generated by a mechanism built in one or both of the right display driver 22 and the left display driver 24 may be reflected off a reflection mechanism provided on the user's side of the frame 3 or 300, that is, the side facing the user's eyes and outputted toward the user's eyes. The reflection mechanism can, for example, be a sweep system using a MEMS (micro electro mechanical systems) mirror. That is, a sweep system having a MEMS mirror that sweeps the light outputted from the image light generation units may be provided, and the light swept by the sweep system may be caused to be directly incident on the user's eyes. Further, the frame 3 may be provided with an optical member on which a virtual image is formed by the light swept by the sweep system. The optical member uses the light swept with the MEMS mirror to form a virtual image. In this case, when the MEMS mirror sweeps light, a virtual image is formed in a virtual image formation plane, and the user captures the virtual image with the eyes to visually recognize (view) the image. The optical part in this case may be a part that guides light by reflecting the light multiple times, for example, the right light guide 26 and the left light guide 28 in the embodiments described above, or may be a half-silvered surface.

The sweep system is not limited to the configuration including a MEMS mirror. The mechanism that generates image light may also instead be a laser light source that emits a laser beam. For example, the invention is also applicable to a laser-retina-projection-type head mounted display. That is, a configuration in which a light output section may include a laser light source and an optical system that guides the laser beam from the laser light source to a user's eyes may be employed. In this configuration, the laser beam is caused to be incident on each of the user's eyes, and the laser beam is swept over the retina to form an image on the retina, so that the user is allowed to visually recognize the image.

Instead, in place of the virtual image formation plane that receives the swept light, a diffraction grating may be used to guide the image light to the user's eyes. That is, the configuration in which the image light is guided through an optical member is not necessarily employed, and a configuration having only a function of guiding the image light toward the user's eyes by refraction and/or reflection of the image light.

In the configuration provided with a sweep system having a MEMS or any other component, changing the angle at which the sweep system is attached to the frame 3 or 300 allows the position where the user visually recognizes an image, that is, the position where an image is displayed to be changed. Therefore, in the process of changing the image display position in each of the embodiments described above, the angle of the sweep system may be changed instead of changing the position where images are displayed in the right LCD 241 and the left LCD 242.

In each of the embodiments described above, the configuration that allows the user's eyes to visually recognize an image may be a configuration in which a hologram element is used to guide image light to the eyes.

As the optical system that guides the image light to the user's eyes, an employable configuration includes an optical member that transmits outside light externally incident on the display apparatus and allows the outside light along with the image light to be incident on the user's eyes. Another usable optical system may be an optical member that is disposed in front of the user's eyes and overlaps with part of the user's visual field or coincides with the user's entire visual field.

In each of the embodiments described above, the configuration in which the half-silvered mirrors 261A and 262A form virtual images on part of the right light guide 26 and the left light guide 28, which are located in front of the user's eyes, is illustrated. The configuration described above is not necessarily employed in the invention, and a configuration in which an image is displayed in a display region that occupies the entire or majority of the right light guide 26 and the left light guide 28 may be employed. In this case, the process of reducing the size of an image may be included in the action of changing the position where the image is displayed.

Further, the optical elements in each of the embodiments of the invention are not limited to the right light guide 26 and the left light guide 28 having the half-silvered mirrors 261A and 262A and only need to be optical parts that cause the image light to be incident on the user's eyes. Specifically, a diffraction grating, a prism, or a holographic display section may be used.

At least part of the functional blocks shown in FIG. 5 and other figures may be achieved by hardware or hardware and software cooperating with each other, and the configuration formed of independent hardware resources shown in FIG. 5 is not necessarily employed. The programs executed by the control section 140 may be stored in the storage section 120 or another storage device (not shown) in the processing section 10, or a program stored in an external device may be acquired via the communication section 117 or any other component and executed. Among the configurations formed in the processing section 10, only the operation section 111 may be formed as a sole user interface (UI).

The entire disclosure of Japanese Patent Application Nos. 2015-256139, filed Dec. 28, 2015 and 2015-256140, filed Dec. 28, 2015 are expressly incorporated by reference herein.

What is claimed is:
1. A display apparatus comprising:
a display section that displays an image with the display section mounted on a user's head in such a way that the user is allowed to visually recognize a real object;
a detection section that detects approach of an instruction body to a region close to the display section; and
a processor configured to operate as:
an operation section that accepts operation; and
a control section that relates a content displayed in the display section to motion of the instruction body detected by the detection section in response to the motion of the instruction body, wherein the control section switches a normal action mode in which a process is executed in correspondence with the operation accepted by the operation section to a proximity operation mode in which a process involving display operation performed by the display section is executed in accordance with a result of the detection performed by the detection section and vice versa, and the control section activates the switched mode, and wherein in the normal action mode, the detection using the detection section is restricted.

2. The display apparatus according to claim 1, wherein the control section causes the display section to display a menu screen, and the control section, in the normal action mode, processes the operation accepted by the operation section as selection or finalization of an item in the menu screen and, in the proximity operation mode, performs selection or finalization of an item in the menu screen in correspondence with approach or separation of an object detected by the detection section.

3. The display apparatus according to claim 1, wherein the display section includes a left eye section located on a side facing the user's left eye and a right eye section located on a side facing the user's right eye in a state in which the display section is mounted on the user's head, and a process executed by the control section is set in relation to a combination of an operation performed on the left eye section and detected by the detection section and an operation performed on the right eye section and detected by the detection section.

4. The display apparatus according to claim 3, wherein the control section causes the display section to display a guide screen containing information on the motion detected by the detection section, information displayed in a left half of the guide screen corresponds to the operation performed on a left portion of the left eye section, and information displayed in a right half of the guide screen corresponds to the operation performed on a right portion of the right eye section.

5. The display apparatus according to claim 3, wherein the control section causes the display section to display an operation screen in an aspect in which the operation screen is visually recognized by both the user's right and left eyes, and the control section changes a displayed content in a left half of the operation screen in correspondence with the operation performed on a left portion of the left eye section and changes a displayed content in a right half of the operation screen in correspondence with the operation performed on a right portion of the right eye section.

6. The display apparatus according to claim 3, wherein the detection section detects approach of an object to the left eye section and approach of an object to the right eye section.

7. The display apparatus according to claim 3, wherein the control section changes the content displayed by the display section in correspondence with moving an object detected by the detection section in an upward/downward direction with respect to the user's head, moving the object detected by the detection section in a rightward/leftward direction with respect to the user's head, and causing the object detected by the detection section to approach or move away from the display section.

8. The display apparatus according to claim 3, wherein the control section accepts input of a position in an upward/downward direction or a rightward/leftward direction with respect to the user's head in a display region of the display section in a case where the detection section detects moving an object along both the right eye section and the left eye section in the upward/downward direction or the rightward/leftward direction.

9. The display apparatus according to claim 1, wherein the detection section detects approach of the instruction body to the display section or a holder that holds an optical part that forms the display section.

10. The display apparatus according to claim 1, wherein the detection section includes proximity sensors disposed around a circumference of the display section and relates the displayed content to the motion of the instruction body detected with the proximity sensors.

11. The display apparatus according to claim 10, wherein in a case where the proximity sensors detect approach of the instruction body to the region close to the display section, the control section causes the display section to display an operation control command image and relates the operation performed on the operation section to the operation control command image.

12. The display apparatus according to claim 1, wherein the display section is configured to transmit outside light so that the real object is allowed to be visually recognized and displays a virtual image in such a way that the virtual image is superimposed on the real object for visual recognition.

13. A display apparatus comprising:
a display section that displays an image with the display section mounted on a user's head in such a way that the user is allowed to visually recognize a real space;
a detection section that detects approach of an instruction body to a region close to the display section; and
a processor configured to operate as:
a control section that executes a process involving display operation performed by the display section in correspondence with a result of detection performed by the detection section; and
an operation section that accepts operation,
wherein the process executed by the control section is set in relation to at least two types of operation performed in the region close to the display section and detected by the detection section, and the control section executes the set process in a case where the detection section detects the at least two types of operation performed in the region close to the display section,
wherein the control section switches a normal action mode in which a process is executed in correspondence with the operation accepted by the operation section to a proximity operation mode in which a process involving display operation performed by the display section is executed in accordance with a result of the detection performed by the detection section and vice versa, and the control section activates the switched mode, and
wherein in the normal action mode, the detection using the detection section is restricted.

14. The display apparatus according to claim 13, wherein the display section includes a left eye section located on a side facing the user's left eye and a right eye section located on a side facing the user's right eye in a state in which the display section is mounted on the user's head, and a process executed by the control section is set in relation to a combination of an operation performed on the left eye section and detected by the detection section and an operation performed on the right eye section and detected by the detection section.

15. The display apparatus according to claim 14,
wherein the detection section detects an operation of causing an object to approach and come into contact with the left eye section and operation of causing an object to approach and come into contact with the right eye section.

16. The display apparatus according to claim 13,
wherein the detection section detects contact to an outer surface of the display section and approach of an object to the outer surface of the display section from a position outside the display section.

17. The display apparatus according to claim 13,
wherein the control section rotates a content displayed in a display region of the display section in a case where the detection section detects a rotation operation.

18. The display apparatus according to claim 13,
wherein in a case where the detection section detects an operation performed on two points and a distance between detected positions at the two points changes, the control section enlarges or reduces a content displayed in a display region of the display section in correspondence with the change in the distance.

19. The display apparatus according to claim 13,
further comprising an imaging section,
wherein in a case where the detection section detects an operation of causing an object to be in contact with a surface of the display section for at least a predetermined period or an operation of causing an object to cover at least a predetermined area of the display section, the control section causes the imaging section to perform imaging.

20. A method for controlling a display apparatus including a display section that displays an image with the display section mounted on a user's head in such a way that the user is allowed to visually recognize a real object and an operation section that accepts operation, the method comprising:
    detecting, using a detection section, approach of an instruction body to a region close to the display section;
    relating a content displayed in the display section to detected motion of the instruction body in response to the motion of the instruction body; and
    switching a normal action mode in which a process is executed in correspondence with the operation accepted by the operation section to a proximity operation mode in which a process involving display operation performed by the display section is executed in accordance with a result of the detection performed by the detection section and vice versa, and activating the switched mode, and
    wherein in the normal action mode, the detection using the detection section is restricted.

21. A method for controlling a display apparatus including a display section that displays an image with the display section mounted on a user's head in such a way that the user is allowed to visually recognize a real space and an operation section that accepts operation, the method comprising:
    setting a process executed in relation to at least two types of operation performed in a region close to the display section;
    detecting, using a detection section, approach of an instruction body to the region close to the display section;
    executing the set process in a case where the at least two types of operation performed in the region close to the display section are detected; and
    switching a normal action mode in which a process is executed in correspondence with the operation accepted by the operation section to a proximity operation mode in which a process involving display operation performed by the display section is executed in accordance with a result of the detection performed by the detection section and vice versa, and activating the switched mode, and
    wherein in the normal action mode, the detection using the detection section is restricted.

* * * * *